(12) United States Patent
Yajima et al.

(10) Patent No.: US 7,561,445 B2
(45) Date of Patent: Jul. 14, 2009

(54) HARNESS ROUTING STRUCTURE FOR VEHICLE

(75) Inventors: Tsutomu Yajima, Kanagawa (JP); Motoo Omori, Tokyo (JP); Hironobu Sugiyama, Kanagawa (JP); Koji Yamashita, Kanagawa (JP)

(73) Assignees: Nissan Motor Co., Ltd., Yokohama-shi (JP); Yazaki Corporation, Tokyo (JP)

( * ) Notice: Subject to any disclaimer, the term of this patent is extended or adjusted under 35 U.S.C. 154(b) by 425 days.

(21) Appl. No.: 11/558,233

(22) Filed: Nov. 9, 2006

(65) Prior Publication Data

US 2007/0119637 A1    May 31, 2007

(30) Foreign Application Priority Data

Nov. 10, 2005  (JP)  ............................. 2005-325843
Nov. 10, 2005  (JP)  ............................. 2005-325844

(51) Int. Cl.
     *H05K 7/02*  (2006.01)
(52) U.S. Cl. .................... 361/826; 361/827; 439/34; 439/503; 307/9.1; 307/10.1; 174/72 A
(58) Field of Classification Search ................ 361/826, 361/827, 828; 174/72 A; 439/34–36, 76.2, 439/502, 503; 307/901, 10.1
     See application file for complete search history.

(56) References Cited

U.S. PATENT DOCUMENTS

| | | | | |
|---|---|---|---|---|
| 4,815,984 A | * | 3/1989 | Sugiyama et al. | 439/211 |
| 5,234,360 A | * | 8/1993 | Kramer, Jr. | 439/505 |
| 5,829,129 A | * | 11/1998 | Ito | 29/857 |
| 5,969,907 A | * | 10/1999 | Yagi et al. | 360/97.01 |
| 5,971,799 A | * | 10/1999 | Swade | 439/502 |
| 6,069,319 A | * | 5/2000 | Davis et al. | 174/72 A |
| 6,142,556 A | * | 11/2000 | Tanaka et al. | 296/146.7 |
| 6,195,884 B1 | * | 3/2001 | Miyamoto et al. | 29/857 |
| 6,220,874 B1 | * | 4/2001 | Kurata et al. | 439/76.2 |
| 6,291,770 B1 | * | 9/2001 | Casperson | 174/72 A |
| 6,429,544 B1 | * | 8/2002 | Sasaki et al. | 307/10.1 |
| 6,439,923 B1 | * | 8/2002 | Kirkendall et al. | 439/502 |
| 6,503,098 B2 | * | 1/2003 | Aoki et al. | 439/502 |

* cited by examiner

*Primary Examiner*—Dameon E Levi
(74) *Attorney, Agent, or Firm*—Foley & Lardner LLP

(57) ABSTRACT

A high-voltage harness routing structure includes: a subframe; a driving power unit; an electric power distribution unit; an electrical auxiliary unit arranged to cause the driving power unit to be sandwiched between the electric power distribution unit and the electrical auxiliary unit; and a high voltage harness connecting the electric power distribution unit with the electrical auxiliary unit in a routing path. In this routing path, the high voltage harness drops from the electric power distribution unit toward the subframe and then extends along the subframe in a vehicle-width direction. The high-voltage harness routing structure further includes a driving power unit mount including a mount main body arranged apart from the subframe to form a space between the mount main body and the subframe; and a protector that covers at least a high-voltage harness's portion extending along the subframe in the vehicle-width direction and interfering with the driving power unit mount. The high voltage harness covered by the protector is passed through the space.

16 Claims, 16 Drawing Sheets

VEHICLE FRONT ←

VEHICLE SIDE VIEW

<OK; PROTECTOR LOWER END ANGLE θ>

<NORMAL>

SECT A-A

<AT COLLISION>

SUBFRAME AFTER COLLISION
SUBFRAME FRONT-SURFACE MOVES BACK AFTER COLLISION
SURVIVAL AREA AFTER COLLISION

PROTECTOR EDGE R

FIG.27A
<PERPENDICULAR>
FIG.27B
<NOT PERPENDICULAR>
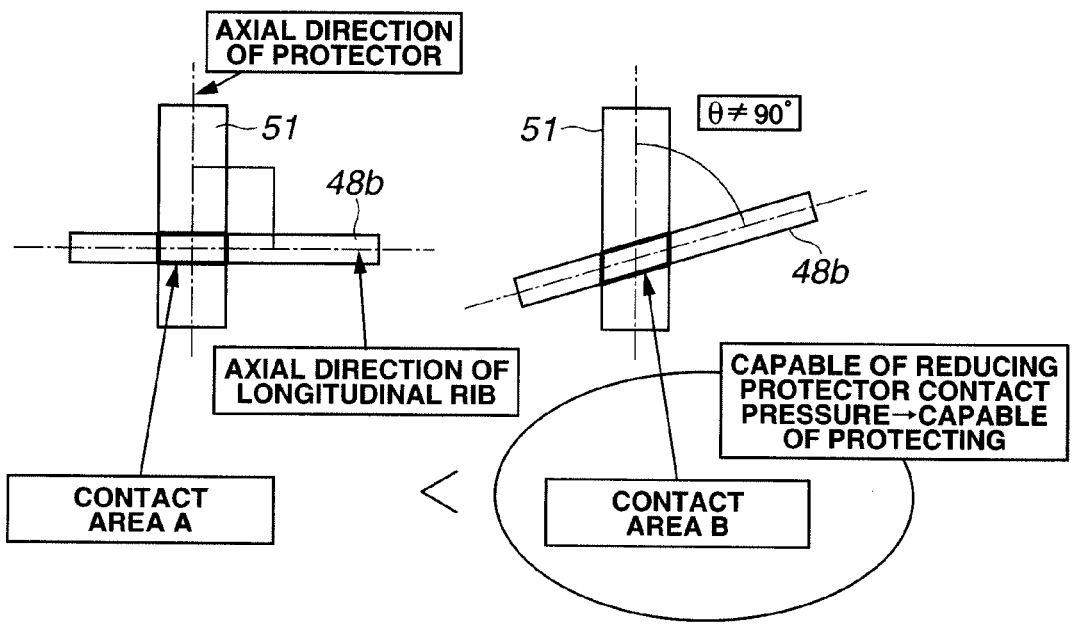
FIG.28A
<PERPENDICULAR>
FIG.28B
<NOT PERPENDICULAR>
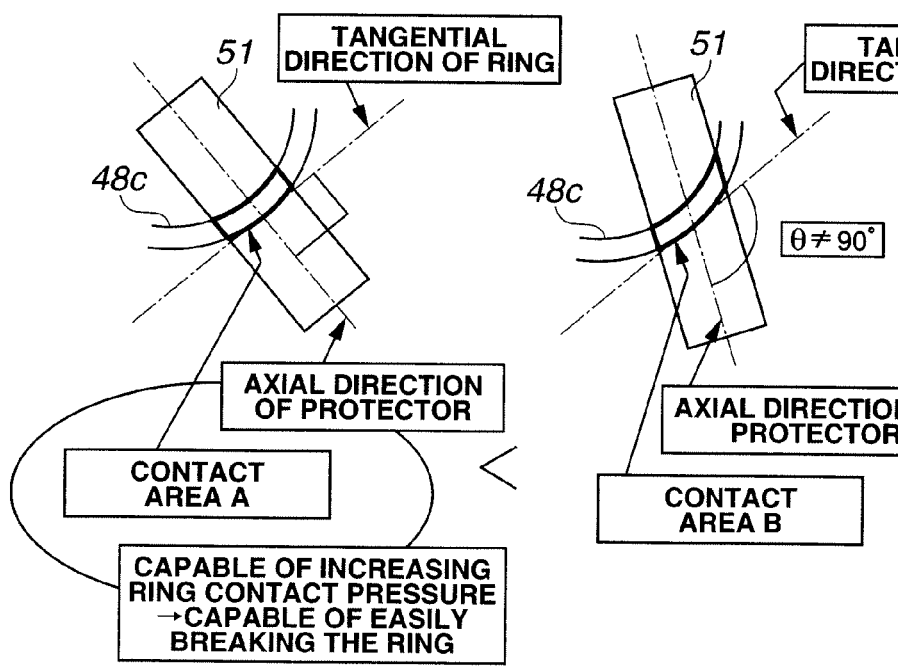

HARNESS ROUTING STRUCTURE FOR VEHICLE

BACKGROUND OF THE INVENTION

The present invention relates to a harness routing structure for a vehicle in which an electric-power distribution unit and an electrical auxiliary unit installed to sandwich a driving power unit are connected through a high voltage harness with each other.

An internet website, TOYOTA home page>showroom>alphard hybrid>function mechanism>hybrid system (URL: http://toyota.jp/alphardhybrid/dynamism/hybrid/index.html) [web searching on Oct. 5, 2005] discloses a previously proposed high voltage harness routing structure for a hybrid vehicle in which a power control unit (inverter) arranged at an upper position of one end side of a hybrid power unit equipped with a transversely mounted engine and motor/generators, and an electric compressor arranged at a lower front position of another end side of the hybrid power unit to sandwich the hybrid power unit between the power control unit and the electric compressor are connected with each other through a high voltage harness. In this structure, as a routing path of the high voltage harness between a connecting terminal of the power control unit and a connecting terminal of the electric compressor, the following detour path is employed. Namely, the high voltage harness is made to extend along an engine intake duct in a vehicle-rear direction from the terminal of power control unit, then to extend in a vehicle-width direction at an upper position behind the hybrid power unit, and then to droop toward the connecting terminal of the electric compressor arranged at a front lower position of the vehicle.

SUMMARY OF THE INVENTION

However, in the above-described previously proposed high voltage harness routing structure for a hybrid vehicle, there are the following problems.

(1) Since the electric compressor is arranged near a front lower position of the transversely mounted engine; the high voltage harness might be caught between a front portion of the engine and a radiator-core support for supporting an upper surface of a radiator arranged in a front area of an engine room, when a frontal collision of the vehicle occurs and thereby the radiator-core support is displaced in the vehicle-rear direction. Hence, there is a possibility that the high voltage harness is broken.

(2) Since the engine intake duct exists on the detour path for routing the high voltage harness; a cross section of the engine intake duct needs to be reduced in order to route the high voltage harness under the situation where a space up to a vehicle body is limited. As a result, an output power of engine is reduced.

(3) Since the detour path for routing the high voltage harness also includes a high-temperature portion of engine exhaust system; the high voltage harness receives a heat deterioration due to high heat derived from the engine exhaust system. Accordingly, a durability life-time of the high voltage harness is shortened.

It is therefore an object of the present invention to provide a high voltage harness routing structure for a vehicle, devised to more certainly protect the high voltage harness covered by a protector from a cut or a damage at the time of collision, while preventing the damage and the lifetime reduction of high voltage harness without affecting a driving performance.

According to one aspect of the present invention, there is provided a high voltage harness routing structure for a vehicle, comprising: a subframe elastically supported by a vehicle body; a driving power unit mounted on the subframe, the driving power unit including a first end portion which is one of right and left end portions of the driving power unit relative to a vehicle-width direction and a second end portion which is another of the right and left end portions; an electric power distribution unit supported by the vehicle body, and arranged near the first end portion; an electrical auxiliary unit supported by the driving power unit, and arranged near the second end portion so as to cause the driving power unit to be sandwiched between the electric power distribution unit and the electrical auxiliary unit; a high voltage harness electrically connecting the electric power distribution unit with the electrical auxiliary unit in a routing path between a connecting terminal of the electric power distribution unit and a connecting terminal of the electrical auxiliary unit, the routing path causing the high voltage harness to drop from the connecting terminal of the electric power distribution unit toward the subframe and then extend along the subframe in the vehicle-width direction; a driving power unit mount including a mount bracket fixed to the subframe and a mount main body fixed to the mount bracket and arranged apart from an upper surface of the subframe to form a space between the mount main body and the subframe; and a protector that covers a periphery of at least a high voltage harness's portion extending along the subframe in the vehicle-width direction and interfering with the driving power unit mount, the high voltage harness covered by the protector being passed through the space formed in the driving power unit mount.

The other objects and features of this invention will become understood from the following description with reference to the accompanying drawings.

BRIEF DESCRIPTION OF THE DRAWINGS

FIGS. 27A and 27B are operational explanatory views each showing an angle relation between the first protector and a cross rib, in the routing structure that the high voltage harness is passed so as to avoid the existing area of fan motor and the existing area of longitudinal ribs in the first embodiment.

FIGS. 28A and 28B are operational explanatory views each showing an angle relation between the first protector and a ring, in the routing structure that the high voltage harness is passed so as to avoid the existing area of fan motor and the existing area of longitudinal ribs in the first embodiment.

DETAILED DESCRIPTION OF THE INVENTION

Reference will hereinafter be made to the drawings in order to facilitate a better understanding of the present invention.

At first, a harness routing structure for a vehicle in a first embodiment according to the present invention is explained below.

First Embodiment

A configuration of the harness routing structure in the first embodiment will now be explained.

[System Configuration of Hybrid Vehicle]

Figure 1:
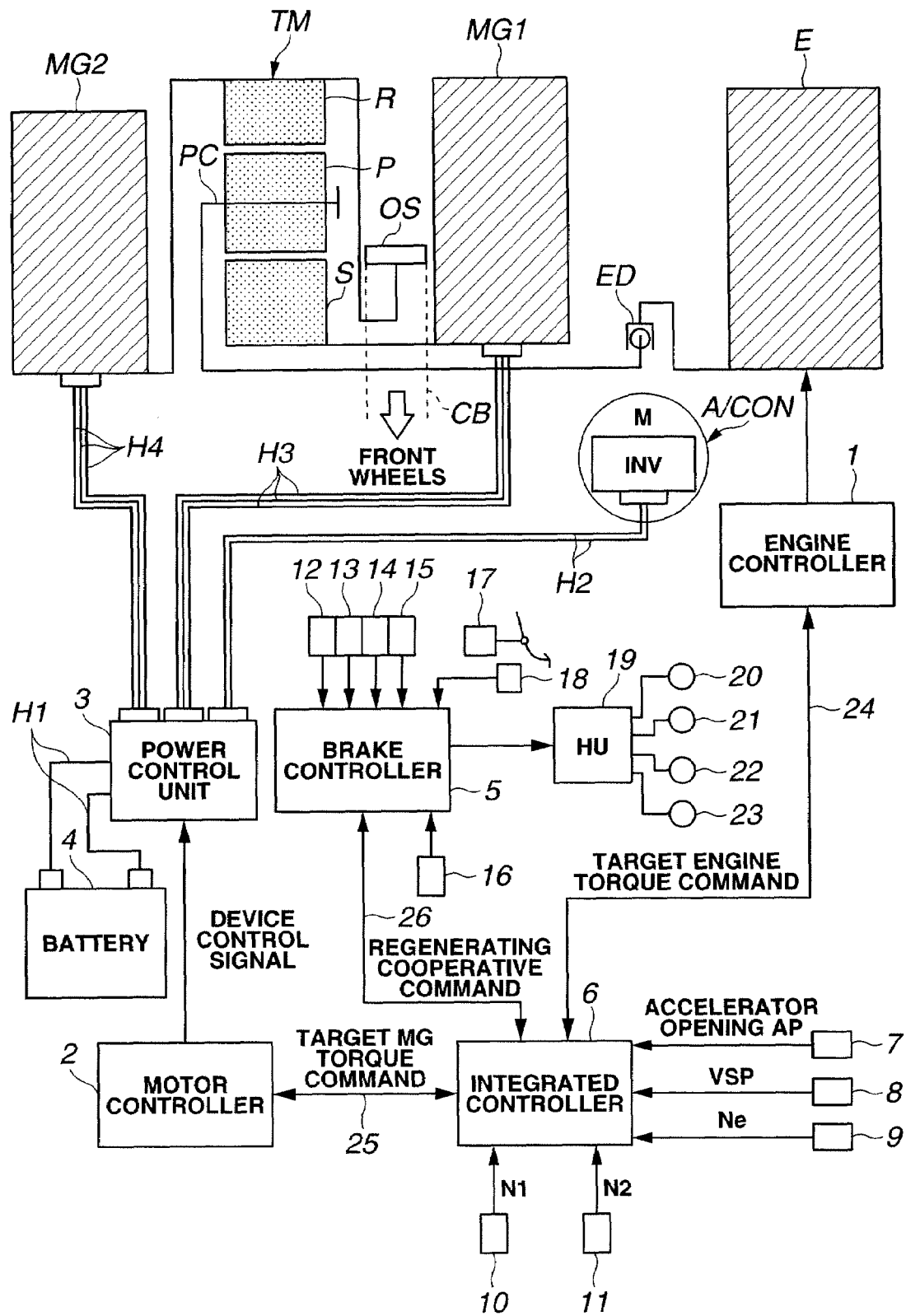
FIG. 1 is a schematic block diagram showing a drive system of a hybrid vehicle to which a high voltage harness routing structure of a first embodiment according to the present invention is applied.

FIG. 1 is a schematic block diagram showing a drive system of a hybrid vehicle (as one example of vehicle) employing the harness routing structure of the first embodiment. As shown in FIG. 1, the drive system of hybrid vehicle in the first embodiment includes an engine E, a first motor/generator MG1, a second motor/generator MG2, an output sprocket OS, a power (torque) split mechanism TM, and an electrical compressor unit (electrical auxiliary unit) A/CON.

Engine E is a gasoline engine or diesel engine. Valve opening of a throttle valve of engine E or the like is adjusted according to a control command derived from an engine controller 1 described below.

Each of first motor/generator MG1 and second motor/generator MG2 is a synchronous-type motor/generator, in which a permanent magnet is set or buried in a rotor and a stator coil is wound around a stator. Each of first motor/generator MG1 and second motor/generator MG2 is independently controlled according to a control command derived from a motor controller 2 described below, by applying three-phase alternating current generated by a power control unit 3. Each of first motor/generator MG1 and second motor/generator MG2 can operate or serve as an electric motor for performing a rotary drive by receiving power supply from a battery 4 (hereinafter, this state is called "power running"). Also when the rotor is being rotated by external force, each of first motor/generator MG1 and second motor/generator MG2 can operate or serve as a generator for generating electromotive force at both ends of the stator coil, and thereby can charge battery 4 (hereinafter, this state is called "regenerating").

Power split mechanism TM is composed of a simple planetary gear mechanism including a sun gear S, a pinion P, a ring gear R, and a pinion carrier PC. Coupling relation between input/output members and the three rotational elements (sun gear S, ring gear R, and pinion carrier PC) of the simple planetary gear mechanism is as follows. Namely, sun gear S is connected with first motor/generator MG1; ring gear R is connected with second motor/generator MG2 and output sprocket OS; and pinion carrier PC is connected with engine E through an engine damper ED. The output sprocket OS is connected to right and left front wheels through a chain belt CB, a differential, and a drive shaft (not shown).

When power split mechanism TM is represented by an alignment chart (lever diagram) with reference to the above-mentioned coupling relation; first motor/generator MG1 (sun gear S), engine E (pinion carrier PC), and second motor/ generator MG2 and output sprocket OS (ring gear R) are arrayed by this order. Accordingly, the rigid-body lever model which can easily express a dynamic motion of the simple planetary gear mechanism is available. In this rigid-body lever model, three rotational speeds (points) are absolutely connected by a straight line.

Now, the "alignment chart" is a speed diagram used for an easier and more intelligible method of solving a speed ratio (gear ratio) by drawings, with which a method of solving the speed ratio by formulas is replaced, when considering the speed ratio in the differential gear. Each rotational speed (number of revolutions) of rotational elements is taken along the vertical axis of the alignment chart, and each rotation element is taken along the lateral axis of the alignment chart. Each space between rotation elements on the lateral axis is so arranged as to cause a ratio in length (S~PC):(PC~R) to be equal to 1:λ, on the basis of a gear ratio λ between sun gear S and ring gear R.

Electrical compressor unit A/CON can drive or operate a compressor by using a motor, in order to be capable of operating an electric air conditioner even in the case of engine stopped state, in an idling-stop vehicle such as a hybrid vehicle. For example, electrical compressor unit A/CON includes an electric compressor assembly combining a scroll compressor with a DC brushless motor, and an inverter serving to drivingly control the motor. Electrical compressor unit A/CON employs a two-way compressor system in which the compressor is driven by a belt as usual when the engine is in operating state, and is driven by the motor when the engine is in stopped state.

Next, a control system of hybrid vehicle will now be explained. The control system of hybrid vehicle in the first embodiment includes engine controller 1, motor controller 2, power control unit (electric power distribution unit) 3, battery (secondary battery) 4, a brake controller 5, and an integrated controller 6, as shown in FIG. 1.

Integrated controller 6 receives input information from an accelerator opening (degree) sensor 7, a vehicle speed sensor 8, an engine (rotational) speed sensor 9, a first motor/generator (rotational) speed sensor 10, a second motor/generator speed sensor 11, and a second motor/generator torque sensor 27. Since both of vehicle speed sensor 8 and second motor/generator speed sensor 11 serve to sense the same output rotational speed of power split mechanism TM; vehicle speed sensor 8 may be omitted, and the sensor signal derived from second motor/generator speed sensor 11 may be used as the vehicle speed signal.

Brake controller 5 receives input information from a front-left wheel speed sensor 12, a front-right wheel speed sensor 13, a rear-left wheel speed sensor 14, a rear-right wheel speed sensor 15, a steering angle sensor 16, and a brake stroke sensor 18 sensing a brake stroke amount of a stroke simulator 17.

Engine controller 1 receives a target engine torque command and the like, from integrated controller 6 to which an accelerator opening AP derived from accelerator opening sensor 7 and an engine speed (number of revolutions) Ne derived from engine speed sensor 9 are inputted. Then, engine controller 1 outputs a command for controlling an engine operating point (Ne and Te) to e.g. a throttle valve actuator (not shown), in accordance with the target engine torque command and the like.

Motor controller 2 receives a target motor/generator torque command(s) and the like, from integrated controller 6 to which motor/generator rotational speeds N1 and N2 derived from both the motor/generator speed sensors 10 and 11 using resolvers are inputted. Then, motor controller 2 outputs a command for independently controlling a motor operating point (N1 and T1) of first motor/generator MG1 and a motor operating point (N2 and T2) of second motor/generator MG2, to power control unit 3. It is noted that this motor controller 2 uses a battery SOC information representing a state of charge of battery 4.

Power control unit 3 constitutes a high voltage unit as a high-voltage power source capable of supplying electric power to both motor/generators MG1 and MG2 with smaller current. Power control unit 3 includes a joint box, a boost (voltage) converter, an inverter for drive motor, an inverter for electric power generator, and a condenser. The inverter for drive motor is connected with the stator coil of second motor/generator MG2. The inverter for electric power generator is connected with the stator coil of first motor/generator MG1. The joint box is connected with battery 4 which is discharged during the power running and is charged during the regenerating. In addition to the above-mentioned inverter function, power control unit 3 also has a power switchboard (distribution) function of distributing the current supplied through a high voltage harness H1 (for direct-current) from battery 4 to electrical compressor unit A/CON through a high voltage harness H2 (for direct-current). It is noted that H3 represents a high voltage harness (for three-phase alternating-current) connected between power control unit 3 and first motor/generator MG1, and H4 represents a high voltage harness (for three-phase alternating-current) connected between power control unit 3 and second motor/generator MG2.

Brake controller 5 performs an ABS control by means of a control command for a brake liquid pressure unit 19 when braking the vehicle on a low friction (μ) road or braking suddenly. Brake liquid pressure unit 19 is adapted to independently control braking liquid pressures of the four wheels. Moreover, brake controller 5 performs a regenerative-brake cooperative control by outputting a control command to integrated controller 6 and outputting a control command to brake liquid pressure unit 19, when braking the vehicle by using an engine brake or foot brake. This brake controller 5 receives a wheel rotational speed information from respective wheel speed sensors 12, 13, 14, and 15; a steering angle information from steering angle sensor 16; and a braking operation quantity (manipulated variable) information from brake stroke sensor 18. Then, brake controller 5 carries out a predetermined process on the basis of these input information, and outputs the control commands according to the process result to integrated controller 6 and brake liquid pressure unit 19. It is noted that brake liquid pressure unit 19 is connected with a wheel cylinder 20 for front-left wheel, a wheel cylinder 21 for front-right wheel, a wheel cylinder 22 for rear-left wheel, and a wheel cylinder 23 for rear-right wheel.

Integrated controller 6 serves to carry out a function of running the vehicle at a maximum or optimum efficiency by checking or managing a total energy consumption of vehicle. Namely, integrated controller 6 carries out the engine operating point control by means of the control command for engine controller 1, during an accelerated running state of the vehicle or the like; and moreover carries out the motor/generator operating point control by means of the control command for motor controller 2 during a stopped, running, or braking state of the vehicle or the like. This integrated controller 6 receives accelerator opening AP, vehicle speed VSP, engine rotational speed Ne, first motor/generator speed N1, and second motor/generator speed N2 from respective sensors 7, 8, 9, 10, 11. Then, integrated controller 6 carries out a predetermined process on the basis of these input information, and outputs the control commands according to the process result to engine controller 1 and motor controller 2. It is noted that integrated controller 6 is connected with engine controller 1, motor controller 2, and brake controller 5 by respectively using two-way communication lines 24, 25, and 26 for information interchange.

Operations of the hybrid vehicle of the first embodiment will now be briefly explained. At the time of start, an ignition key is turned on and thereby engine E is started. Then, engine E is stopped right away after warming up engine E. When the vehicle starts moving or runs at a low load, namely when the vehicle starts moving or runs down a moderate hill at a very low speed (velocity) or the like; engine E is stopped or deactivated in the region where an engine efficiency is low so that a fuel is cut, accordingly the vehicle runs by second motor/generator MG2. When the vehicle runs normally; a driving force of engine E is divided by power split mechanism TM, accordingly one of the driving force directly drives the wheels and the other driving force drives first motor/generator MG1 (as a power generator) and assists second motor/generator MG2. When the vehicle is accelerated at a full throttle; battery 4 supplies the power and thereby a further driving force is added. When the vehicle is decelerated or braked; second motor/generator MG2 is driven by the wheels and thereby functions as power generator so that the regenerative electric power generation is performed. At this time, thus-retrieved electric energy is stored in battery 4. In the case where the charge amount of battery 4 becomes low, the charging is started by causing engine E to drive first motor/generator MG1 (as power generator). When the vehicle is in stopped state; engine E is automatically stopped except while using the air conditioner, charging the battery, or the like.

[Hybrid System Configuration when Routing High Voltage Harness H2]

Figure 2:
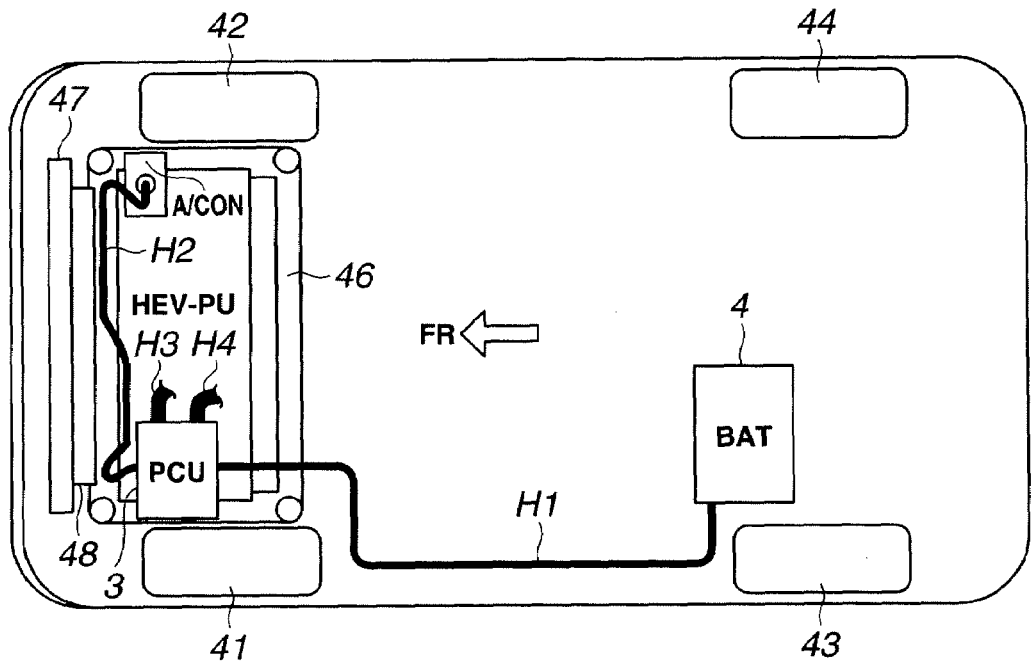
FIG. 2 is a plan view showing a FF-drive-system layout of the hybrid vehicle to which the high-voltage harness routing structure of the first embodiment is applied.
Figure 3:
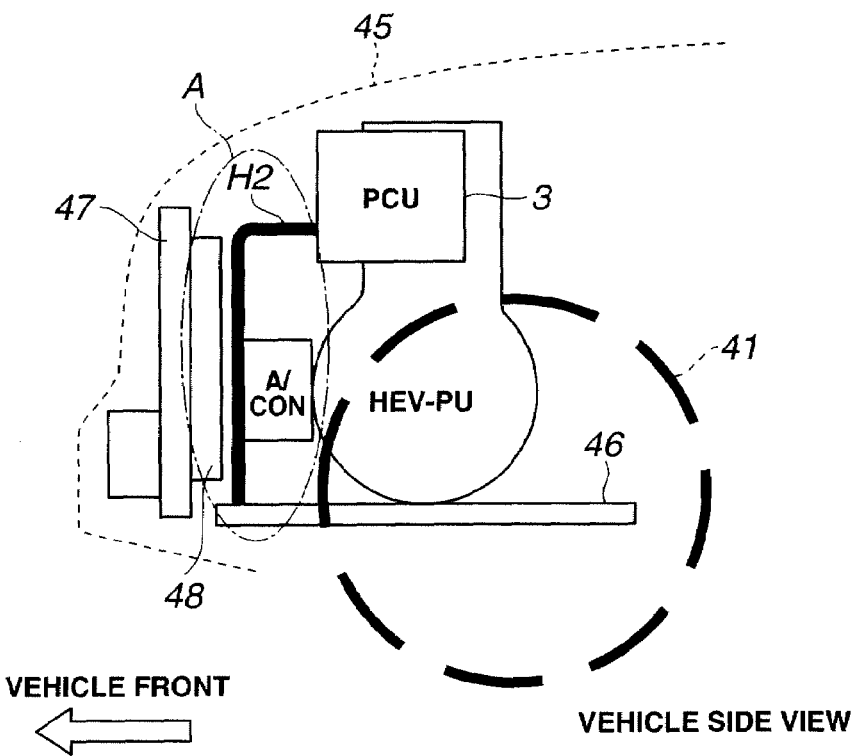
FIG. 3 is a side view showing the FF-drive-system layout of the hybrid vehicle to which the high-voltage harness routing structure of the first embodiment is applied.

FIG. 2 is a plan view showing a FF (Front engine Front drive)-drive-system layout of a hybrid vehicle in which the routing structure of the harness (for high voltage) in the first embodiment according to the present invention is employed. FIG. 3 is a side view showing the FF-drive-system layout of the hybrid vehicle in which the routing structure of harness in the first embodiment is employed. The hybrid system configuration for routing high voltage harness H2 will be explained below referring to FIGS. 2 and 3. In this first embodiment, transversely mounted engine E, first motor/generator MG1, and second motor/generator MG2 which are provided as driving sources are together called a hybrid power unit HEV-PU (driving power unit). Namely, hybrid power unit HEV-PU includes engine E, first motor/generator MG1, and second motor/generator MG2.

The hybrid vehicle to which the high-voltage harness routing structure of the first embodiment is applied includes front-left wheel 41, front-right wheel 42, rear-left wheel 43, rear-right wheel 44, a vehicle body 45, battery 4, a pound (#shaped) subframe 46, hybrid power unit HEV-PU, power control unit 3, electrical compressor unit A/CON, a radiator 47, a radiator shroud 48, and high voltage harnesses H1, H2, H3, and H4, as shown in FIGS. 2 and 3.

In the hybrid vehicle shown in FIGS. 2 and 3, vehicle body 45 elastically supports pound subframe (subframe) 46; hybrid power unit HEV-PU (driving power unit) is mounted on the pound subframe 46; power control unit (electric power distribution unit) 3 is supported by the vehicle body 45 and is arranged in an upper position of a left end portion of hybrid power unit HEV-PU (i.e., arranged near a first end portion of hybrid power unit HEV-PU) relative to a vehicle width direction; electrical compressor unit (electrical auxiliary unit) A/CON is supported by the power unit HEV-PU and is arranged in a lower front position of a right end portion of hybrid power unit HEV-PU (i.e., arranged near a second end portion of hybrid power unit HEV-PU) relative to the vehicle width direction; and the power control unit 3 and electrical compressor unit A/CON which are laid out to sandwich the hybrid power unit HEV-PU are connected with each other through the (high voltage) harness H2.

The battery 4 is arranged in a rear portion of the vehicle. Battery 4 is connected with power control unit 3 through the high voltage harness H1. The radiator 47 and radiator shroud 48 are arranged anterior to the hybrid power unit HEV-PU and close to the hybrid power unit HEV-PU.

Namely as shown in A-area of FIG. 3, in a front end portion of vehicle, hybrid power unit HEV-PU, radiator 47, and radiator shroud 48 of the hybrid vehicle are located in proximity to one another relative to the front-rear direction of vehicle. The harness H2 is routed in a space of this front end portion which is very narrow and very restrained.

[Entire Routing Structure of High-Voltage Harness H2]

Figure 4:
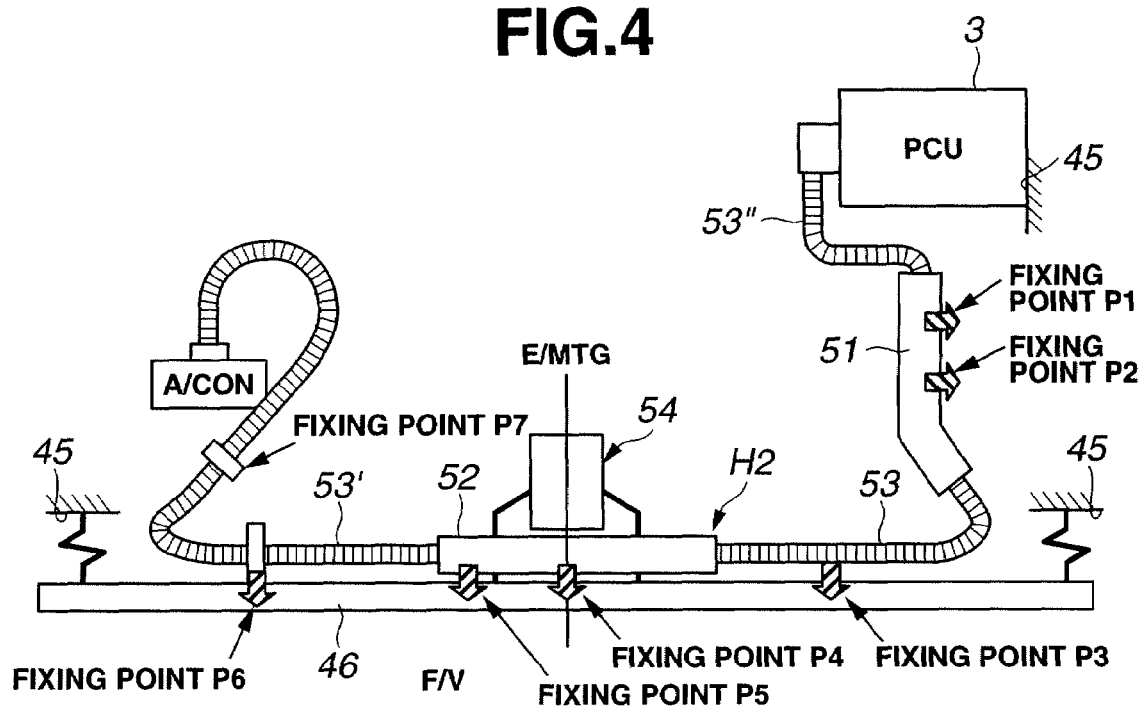
FIG. 4 is a front view showing the routing structure of high voltage harness in the first embodiment.
Figure 5A:
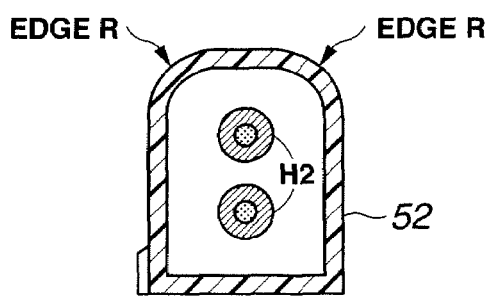
FIG. 5A is a view showing the harness covered by a protector which is employed in the harness routing structure of the first embodiment.
Figure 5B:
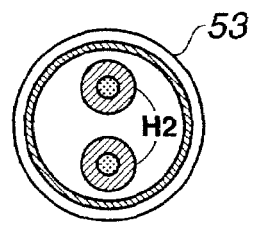
FIGS. 5B and 5C are views each showing the harness covered by a corrugated tube which is employed in the harness routing structure of the first embodiment.
Figure 5C:
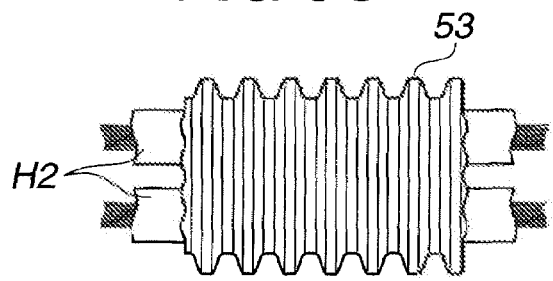
Figure 6A:
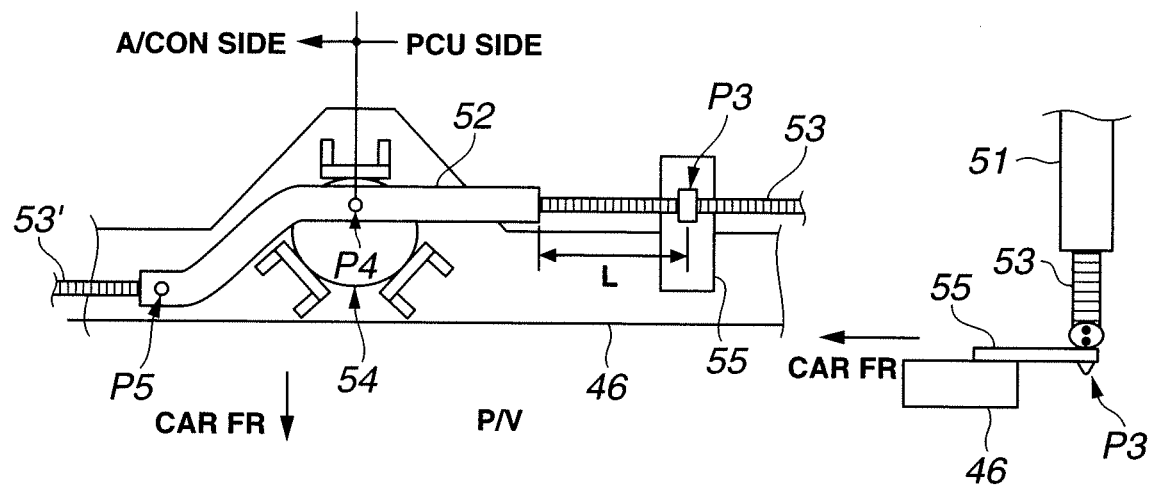
FIG. 6A is a plan view showing a second protector portion in the harness routing structure of the first embodiment.
Figure 6B:
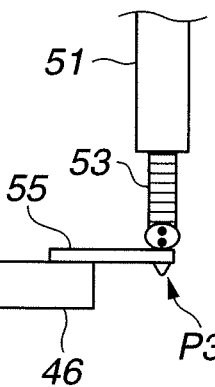
FIG. 6B is a side view showing the second protector portion in the harness routing structure of the first embodiment.
Figure 7:
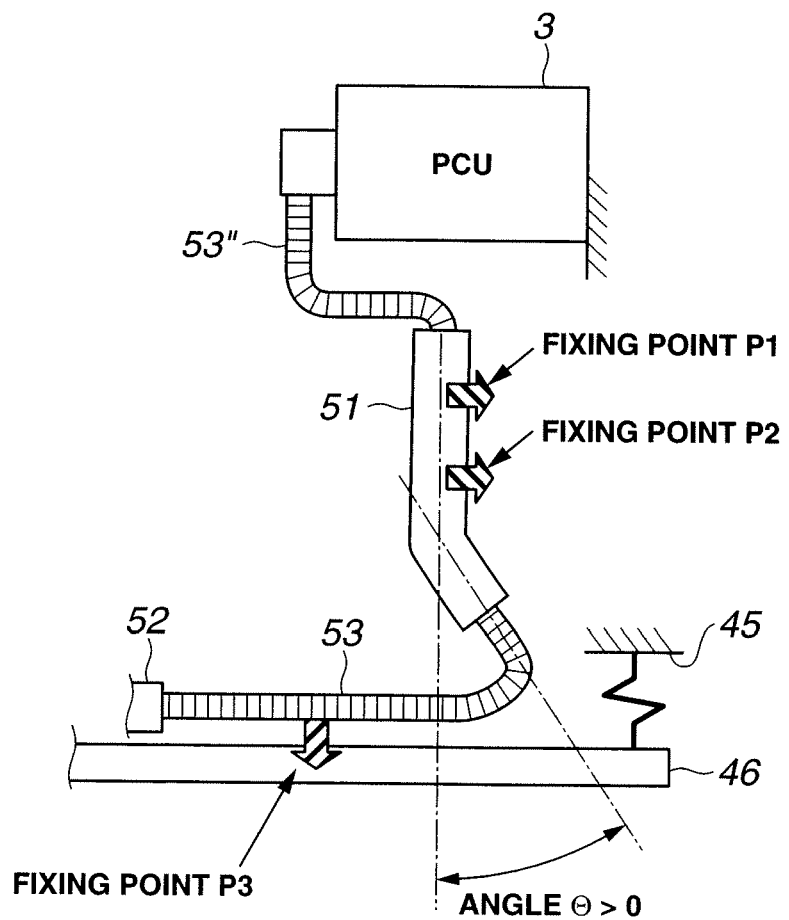
FIG. 7 is a front view showing a first protector portion in the high-voltage harness routing structure of the first embodiment.

FIG. 4 is a front view showing the routing structure of high voltage harness in the first embodiment. FIG. 5A is a view showing the (high voltage) harness H2 covered by a protector which is employed in the harness routing structure of the first embodiment. FIGS. 5B and 5C are views showing the (high voltage) harness H2 covered by a corrugated material (tube) which is employed in the harness routing structure of the first embodiment. FIG. 6A is a plan view showing a second protector portion in the harness routing structure of the first embodiment. FIG. 6B is a side view showing the second protector portion in the harness routing structure of the first embodiment. FIG. 7 is a front view showing a first protector portion in the harness routing structure of the first embodiment. The entire routing structure for high voltage harness H2 in the first embodiment will now be explained below referring to FIGS. 4 to 7.

As shown in FIG. 4, a routing path (wiring path) of the harness H2 used for mainly relatively-high voltage or power from a connecting terminal of the power control unit 3 to a connecting terminal of electrical compressor unit A/CON employs the following detour path. Namely in this embodiment, the high voltage harness H2 drops toward the pound subframe 46 from the connecting terminal of power control unit 3, and then extends along the pound subframe 46 in the vehicle-width direction.

The protector for covering or enclosing a periphery of the high voltage harness H2 is divided into first protector 51 and second protector 52. The first protector 51 covers the periphery of a harness H2's portion dropping toward the pound subframe 46 from the connecting terminal of power control unit 3. The second protector 52 covers the periphery of a harness H2's portion extending in the vehicle-width direction along the pound subframe 46. In detail, the second protector 52 covers the periphery of at least a harness H2's portion extending along the pound subframe 46 in the vehicle-width direction and interfering with an engine mount 54 or the like (i.e., harness H2's portion including a portion having the possibility of interfering with engine mount 54 at the time of collision or the like, for example a portion overlapping with engine mount 54 or with brackets of engine mount 54 as viewed in front-rear or up-down direction). Now, the second protector 52 is made of or molded out of a hard plastic material, is formed with an inner space (through-hole) through which high-voltage harness H2 is inserted, and is formed in a rectangular shape in cross section, as shown in FIG. 5A. Further, the second protector 52 is formed with rounded edges R at both end portions of a second protector 52's upper surface located to the side of the engine mount (driving power unit mount) 54.

A first protector 51's upper portion located to the side of power control unit 3 is fixed or secured to vehicle body 45. A first protector 51's lower portion located to the side of pound subframe 46 is not fixed to vehicle body 45, i.e., is free from the fastening to vehicle body 45. It is noted that the upper portion of first protector 51 is fixed through brackets to vehicle body 45 (for example, to a side member of vehicle body) at fixing points P1 and P2. For example, the upper portion and the lower portion of first protector 51 are defined by bordering the first protector 51 into substantially vertically-half-length two portions.

A portion of high-voltage harness H2 from a lower end of first protector 51 up to the second protector 52 is not covered by the protector. A periphery of this portion between the first protector 51 and the second protector 52 is covered by the corrugated tube (material) 53 having a deformation (change-of-shape) following capability. The corrugated tube 53 is made of or molded out of a soft plastic (nonrigid plastic) material, is formed with an inner space through which high-voltage harness H2 is inserted, and is formed in a circular shape in cross section, as shown in FIGS. 5B and 5C. Further, the corrugated tube 53 is formed to repeat annular projection and depression (concave and convex portions) in an axial direction of corrugated tube 53 so that flexibility and plasticity can be secured.

The portion of high-voltage harness H2 from the lower end of the first protector 51 up to the second protector 52, namely the portion not enclosed with the protector and instead enclosed with corrugated tube 53 as mentioned above is fixed to a bracket 55 fixed on the pound subframe 46, at a vehicle-inner position beyond the pound subframe 46, as shown in FIGS. 6A and 6B. In other words, the portion of high-voltage harness H2 between the first protector 51 and the second protector 52 is secured to the pound subframe 46 at a position posterior to pound subframe 46 through the bracket 55. Namely, this portion enclosed with corrugated tube 53 is secured on an vehicle-inner side of bracket 55.

If the second protector 52 is divided into a part of electrical compressor unit A/CON side and a part of power control unit 3 side (i.e., one part closer to electrical compressor unit A/CON and another part closer to power control unit 3) relative to the vehicle-width direction for illustrative purpose; the part of electrical compressor unit side is directly fixed on the pound subframe 46 as shown in FIG. 6A. The part of power control unit side is not fixed to the pound subframe 46, i.e., is free from the fastening to pound subframe 46. Now, the electrical-compressor-unit side part of second protector 52 is directly fixed to pound subframe 46 at fixing points P4 and P5. It is noted that second protector 52 is imaginarily divided into the two of electrical-compressor-unit side part and power-control-unit side part by regarding an after-mentioned fixing point P4 as a border (or divided into two half parts).

In a portion extending in the vehicle-width direction along the pound subframe 46, among the above-mentioned portion enclosed with corrugated tube 53; the corrugated tube 53 is fixed to pound subframe 46 at the fixing point P3, as shown in FIGS. 6A and 6B. This fixing point P3 is located apart from an end surface of second protector 52 by a length L in the vehicle-width direction. The length L is prescribed to allow the harness H2's portion enclosed with corrugated tube 53 to follow the deformation of pound subframe 46. Now in order to fix the corrugated tube 53, for example, a band-attached wiring clip is attached on the fixing point of corrugated tube 53, and is fixedly inserted into a hole formed in bracket 55.

Among the high-voltage harness H2's portion enclosed with corrugated tube 53 between first protector 51 and second protector 52, a portion dropping from the lower end of first protector 51 is made to drop in a direction slanted toward the outside of vehicle from the vertical direction, as shown in FIG. 7. Such a slanting angle θ toward the vehicle outside relative to the vehicle-width direction is set so as to allow the corrugated tube 53 to keep its extra length capable of following the movement of pound subframe 46 even if the pound subframe 46 is relatively moved in up-down direction at the time of vehicle collision (or, after the collision). The corrugated tube 53 includes overlapping portions for overlapping with both protectors 51 and 52, at both end portions of corrugated tube 53. These overlapping portions are inserted into both protectors 51 and 52.

A high-voltage harness H2's portion not-covered with the protector from the second protector 52 up to the electrical compressor unit A/CON is constructed similarly as the portion located between both protectors 51 and 52. Namely, a periphery of this portion between second protector 52 and electrical compressor unit A/CON is covered by a corrugated tube (material) 53' having a deformation following capability, as shown in FIG. 4. This portion covered by corrugated tube 53' is fixed to the pound subframe 46, at fixing points P6 and P7.

Further, a high-voltage harness H2's portion not-covered with the protector from the power control unit 3 up to the first protector 51 is constructed similarly as the portion located between both protectors 51 and 52. Namely, a periphery of this portion between power control unit 3 and first protector 51 is covered by a corrugated tube (material) 53" having a deformation following capability, as shown in FIG. 4. This portion covered by corrugated tube 53" is free from the fastening to vehicle body 45.

[Pound Subframe Routing Structure of High Voltage Harness H2]

Figure 8:
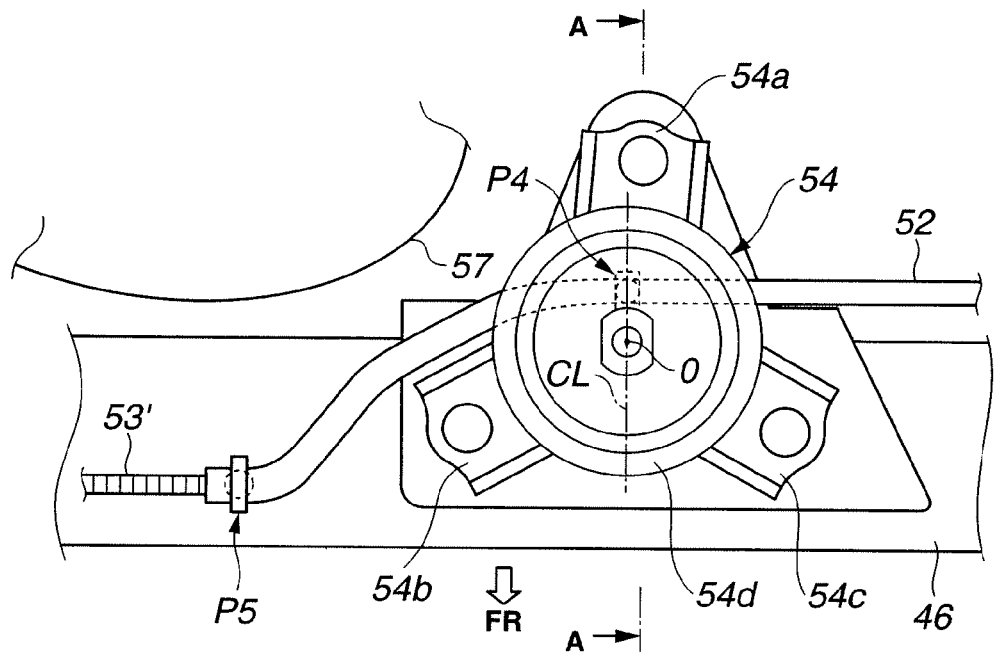
FIG. 8 is a plan view showing an area around the second protector passed in an engine mount in the high-voltage harness routing structure of the first embodiment.
Figure 9:
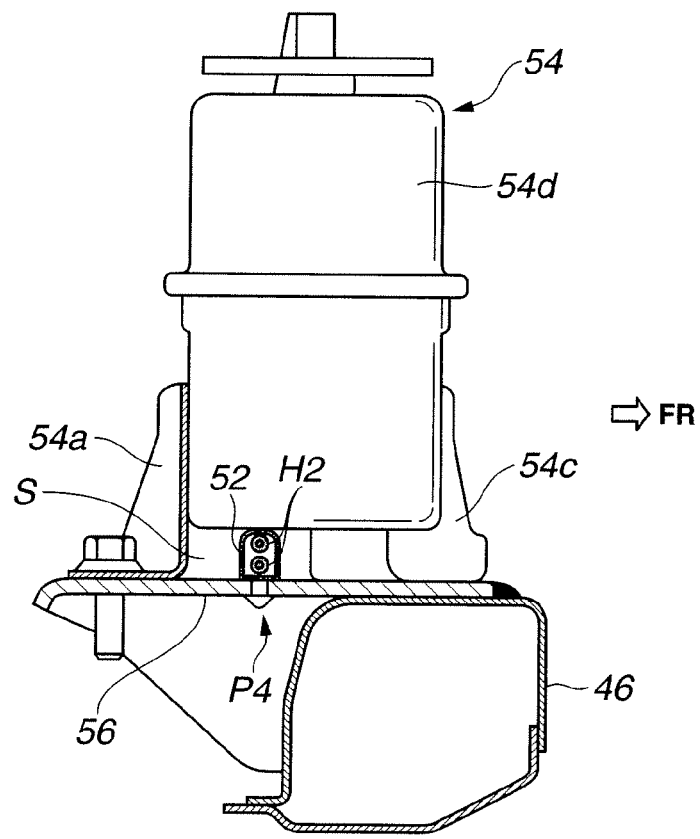
FIG. 9 is a section view of FIG. 8 taken along a line A-A, showing the area around the second protector passed in the engine mount in the high-voltage harness routing structure of the first embodiment.

FIG. 8 is a plan view showing an area around the second protector 52 passed in the engine mount 54 in the routing structure of high voltage harness in the first embodiment. FIG. 9 is a section view of FIG. 8 taken along a line A-A. The pound subframe routing structure for high voltage harness H2 in the first embodiment will now be explained below referring to FIGS. 8 and 9.

Engine mount (driving power unit mount) 54 includes a mount main body 54d; and mount brackets 54a, 54b, and 54c for fixing the mount main body 54d to the pound subframe 46. The mount main body 54d is fixed to the mount brackets 54a, 54b, and 54c. The mount brackets 54a, 54b, and 54c secure the mount main body 54d to the pound subframe 46, at a constant point of pound subframe 46 in the vehicle-width direction. Engine mount 54 provides a space S formed by placing the mount main body 54d apart from the upper surface of pound subframe 46 by means of brackets. Now, mount brackets 54a, 54b, and 54c of engine mount 54 are fixed on a bracket 56. The bracket 56 is fixed on the upper surface of pound subframe 46 by welding, and protrudes in a vehicle-rear direction.

Among the high-voltage harness H2's portion extending in the vehicle-width direction along the pound subframe 46, a periphery of a high-voltage harness H2's portion including a portion interfering (overlapping) with engine mount 54 is covered by second protector 52, as shown in FIGS. 8 and 9. This portion covered by second protector 52 is passed through the space S formed in the engine mount 54.

The second protector 52 passed through the space S provided in engine mount 54 is fixed to the pound subframe 46 at the fixing point P4. This fixing point P4 is located on an imaginary center line CL drawn in the front-rear direction via a center O of the engine mount 54, as viewed from top.

If the second protector 52 passed through the space S provided in engine mount 54 is divided into the part of electrical compressor unit A/CON side and the part of power control unit 3 side relative to the vehicle-width direction for illustrative purpose (see FIG. 6A); the part of power control unit side is free from the fastening to pound subframe 46, and placed at a vehicle-inner position beyond the pound subframe 46 (i.e., posterior to a front bar of pound subframe 46) relative to the front-rear direction. Further, two high voltage harnesses H2 are arranged vertically (up and down) within the second protector 52, as shown in the cross section view of FIG. 9.

The mount main body 54d is supported at three points by the first mount bracket 54a, the second mount bracket 54b, and the third mount bracket 54c. The first mount bracket 54a is set at a relatively vehicle-inner position of a periphery of mount main body 54d, and the second mount bracket 54b and third mount bracket 54c are set at relatively vehicle-outer positions of the periphery of mount main body 54d with respect to the front-rear direction. The second protector 52 is located between the center O of engine mount 54 and the first mount bracket 54a, as viewed from top.

The second protector 52 inserted through the space S provided in engine mount 54 provides the edges (rounded corners) R in the protector's upper surface facing a bottom surface of mount main body 54d under the inserted state, as shown in FIG. 9 (also see FIG. 5A). In FIG. 8, a reference numeral 57 represents a heat shield panel serving to shield against a heat generated by power control unit 3.

[Radiator Shroud Routing Structure of High Voltage Harness H2]

Figure 10:
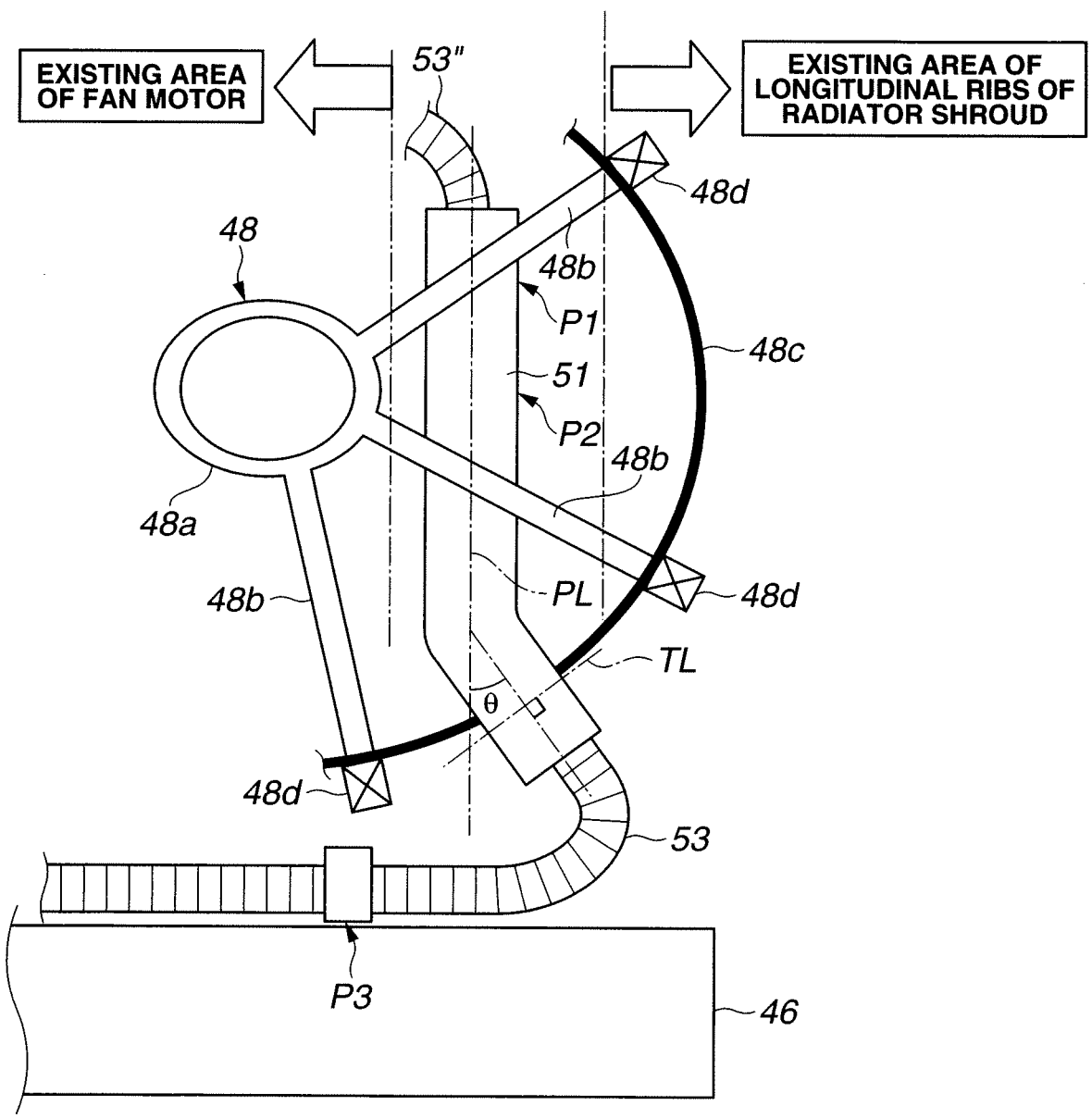
FIG. 10 is a front view showing an area around the first protector passed behind a radiator shroud in the high-voltage harness routing structure of the first embodiment.

FIG. 10 is a front view showing an area around the first protector 51 passed behind the radiator shroud 48 in the high-voltage harness routing structure of the first embodiment. The radiator shroud routing structure for high voltage harness H2 in the first embodiment will now be explained below referring to FIG. 10.

Among the high-voltage harness H2's portion dropping toward the pound subframe 46, a periphery of a high-voltage harness H2's portion including a portion interfering (possibly-interfering, or overlapping) with radiator shroud 48 is covered by first protector 51, as shown in FIG. 10. This portion covered by first protector 51 is routed in an area set by avoiding an existing area of a motor for fan and an existing area of longitudinal ribs of radiator shroud 48. Namely, the area except the existing area of fan motor and the existing area of longitudinal ribs of radiator shroud 48 is specified as a routing path (area).

Here, the radiator shroud 48 includes an annular motor rib 48a to which the fan motor (not shown) is connected; a plurality of cross (transverse) ribs 48b radially extending from the motor rib 48a and provided at even intervals in a circumferential direction of motor rib 48a; a ring 48c connecting the plurality of cross ribs 48b to one another; and the plurality of longitudinal ribs 48d each extending in the front-rear direction of vehicle at an extension portion of cross rib 48b.

The high-voltage harness H2's portion covered by the first protector 51 is arranged to cause a routing axis (routing line) PL of first protector 51 to intersect with two cross ribs 48b of radiator shroud 48 at some angles except right angle, as shown in FIG. 10.

The high-voltage harness H2's portion covered by the first protector 51 is arranged to cause the protector's routing axis PL to intersect with a tangent (line) TL of the ring 48c of radiator shroud 48 at right angle, as shown in FIG. 10.

In the high-voltage harness H2's portion covered by the first protector 51, an upper portion of first protector 51 which is located to the side of power control unit 3 is fixed to vehicle body 45 at fixing points P1 and P2. A lower portion of first protector 51 which is located to the side of pound subframe 46 is not fixed to vehicle body 45 i.e., is free from the fastening to vehicle body 45 as shown in FIG. 4. This first protector's upper portion is made to drop straight (right down), and the first protector's lower portion is made to drop at the angle θ inclined toward the vehicle outside. Accordingly, the high-voltage harness H2's portion covered by the first protector 51 is laid out so as to cross with the cross ribs 48b of radiator shroud 48 at some angles except right angle, and also so as to cross with the tangent TL of the ring 48c of radiator shroud 48 at right angle. The high-voltage harness H2's portion dropping from the lower end of first protector 51 at the vehicle-outside-inclined angle θ is coved with the corrugated tube 53.

The first protector's lower portion inclined by the angle θ from the first protector's upper portion is located at a midsection between the circumferentially-adjacent cross ribs 48b and 48b (also longitudinal ribs 48d and 48d) of radiator shroud 48.

Next, the operations and benefits in the first embodiment will be explained below.

[Operations and Benefits of Entire Routing of High Voltage Harness H2]

At first, operations and benefits of the entire routing structure of high voltage harness H2 in the first embodiment will now be explained referring to FIGS. 11 to 17.

Figure 11:
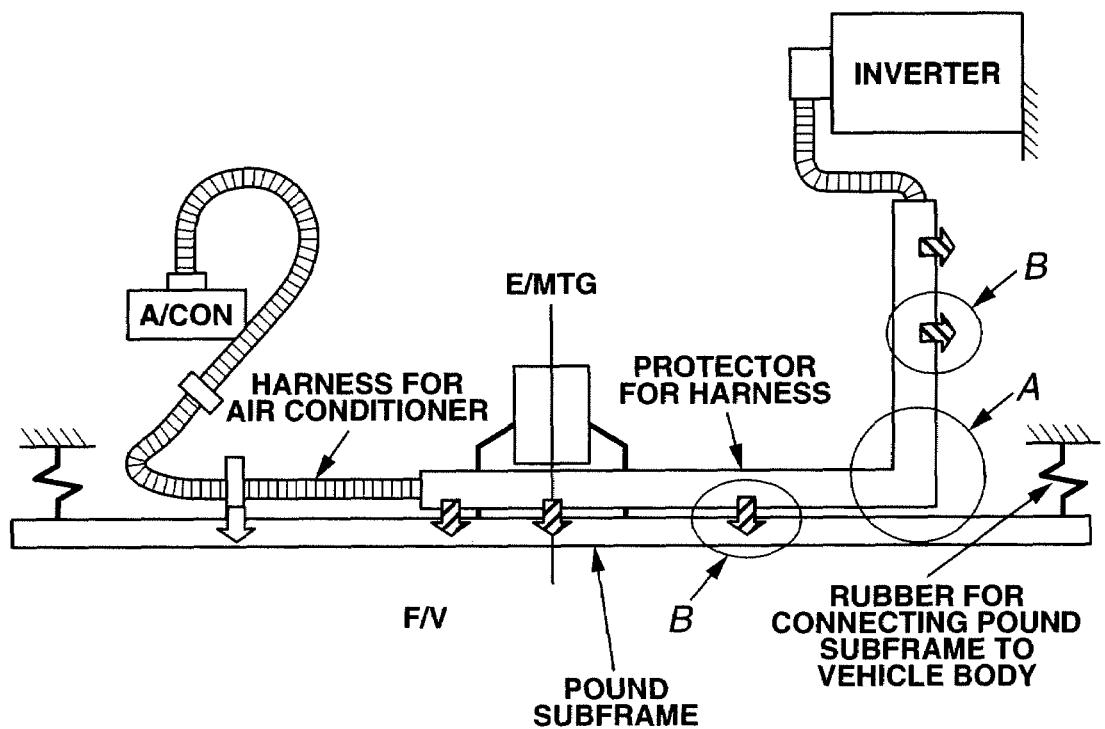
FIG. 11 is a view explaining one structural example of whole routing in the case where a high voltage harness is covered by a protector.

For example, in the case where a high voltage harness for an electric compressor is routed on the pound subframe and the high voltage harness is covered by a protector in preparation for a collision when considering a layout inside a hybrid vehicle; it is a convincing way to use an integrated protector as shown in FIG. 11. In such a case, there are the following problems.

Problem 1

The protector is fixed to both of the vehicle body and the pound subframe to straddle therebetween, as shown in "A" region of FIG. 11. Hence, an oscillation or vibration of the pound subframe cannot be absorbed. Thereby, the protector receives an excessive force and is damaged.

Problem 2

The protector is fixed to both of the vehicle body and the pound subframe to straddle therebetween. Hence, it is difficult to physically attach the protector to the both, as shown by "B" regions of FIG. 11.

Problem 3

Figure 12:
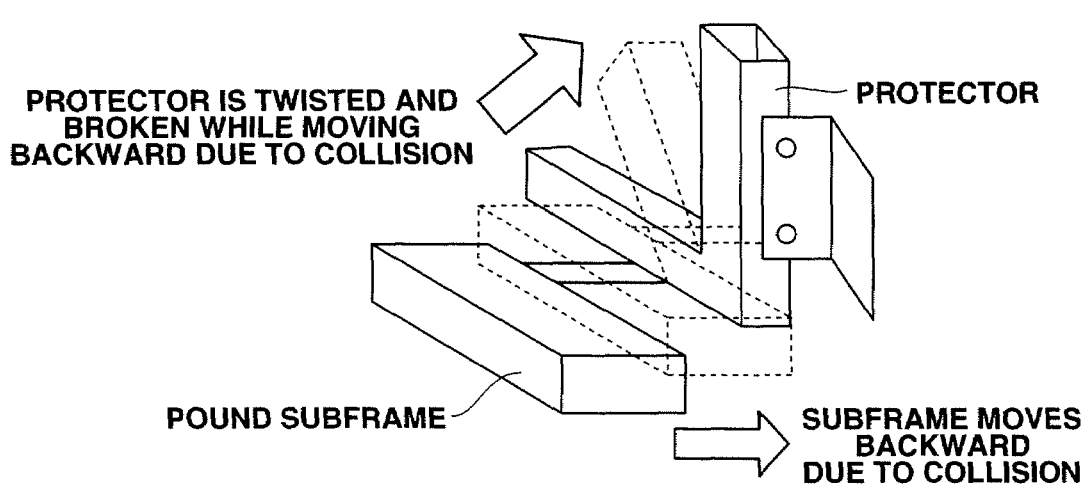
FIG. 12 is a view explaining a problem of the whole routing in the case where the high voltage harness is covered by the protector.

When a vehicle collision or the like occurs, the pound subframe is made to move backward by a large degree. In response to this, the protector mounted on the pound subframe is also made to move backward as shown in FIG. 12. As a result, a large relative displacement of protector occurs from its mounting portion for mounting the protector on the vehicle body. Accordingly, a vehicle-body mount bracket and the protector itself cannot absorb this relative displacement, and are damaged.

In contrast, in the harness routing structure of the first embodiment, the routing path for high voltage harness H2 employs the detour path that the high voltage harness H2 extends along the pound subframe 46 in the vehicle-width direction. Moreover, the protector for covering the periphery of high voltage harness H2 is divided into first protector 51 dropping toward the pound subframe 46 and second protector 52 extending in the vehicle-width direction along the pound subframe 46. Therefore, both of a high protective performance for high voltage harness H2 and a proper oscillation absorption can be achieved without affecting a drive performance, while preventing the high voltage harness H2 from being damaged and preventing a lifetime of high voltage harness H2 from being reduced.

In detail, in the harness routing structure of the first embodiment, the routing path of harness H2 between the connecting terminal of power control unit 3 and the connecting terminal of electrical compressor unit A/CON employs the detour path in which the harness H2 drops toward the pound subframe 46 from the connecting terminal of power control unit 3 and then extends along the pound subframe 46 in the vehicle-width direction. Therefore, since the high-voltage harness routing structure of this embodiment is different from a comparative case in which the detour path that the high voltage harness is passed at an upper position of a space behind the power unit (a rear space from the power unit) is employed; an air intake duct of engine does not exist on or near the detour path of this embodiment. Accordingly, the high-voltage harness routing structure of this embodiment does not cause a reduction in drive performance such as an engine output-power reduction. Further in the detour path of this embodiment, the high voltage harness H2 does not exist at a position between the hybrid power unit HEV-PU and a radiator-core support, and thereby a damage of high voltage harness H2 can be prevented at the time of frontal collision. Further in the detour path of this embodiment, the harness H2 is passed in the vehicle-width direction through a clearance formed under the hybrid power unit HEV-PU, so as to avoid the proximity of an engine exhaust system having a tendency to reach a high temperature. Hence, the lifetime reduction of high voltage harness H2 can be prevented.

In detail, in the harness routing structure of the first embodiment, the protector for covering the periphery of high voltage harness H2 is divided into the first protector 51 covering the periphery of the harness H2's portion dropping toward the pound subframe 46 from the connecting terminal of power control unit 3; and the second protector 52 covering the periphery of the harness H2's portion extending in the vehicle-width direction along pound subframe 46. Therefore, the high protective performance for high voltage harness H2 is produced by virtue of the configuration that the protector covers the periphery of high voltage harness H2. Further in the harness routing structure of the first embodiment, the harness H2's portion sandwiched by dividing the protector into the above-mentioned two pieces, namely the portion which extends while varying its extending direction from the vertical (down) direction to the horizontal (vehicle-width) direction is not covered by the protector so that this portion has flexibility. Accordingly, even if an input force (external force) capable of displacing the pound subframe 46 occurs during the vehicle running, this non-protector portion absorbs a relative displacement between the power control unit 3 supported by the vehicle body and the electrical compressor unit A/CON supported by the hybrid power unit HEV-PU. Namely, such a relative displacement can be absorbed by the oscillation of non-protector portions having flexibility.

As the result, both of the high protective performance for high voltage harness H2 and the oscillation absorption can be achieved without affecting the drive performance, while preventing the high voltage harness H2 from being damaged and preventing the lifetime of high voltage harness H2 from being reduced. Additionally, since the protector is separated into first protector 51 located near vehicle body 45 and second protector 52 located near pound subframe 46; it becomes possible to assemble the protectors separately to both of vehicle body 45 and pound subframe 46. Thus, the physical assembling comes to be possible, unlike the comparative case where the integrated protector for high voltage harness is used for routing on the pound subframe.

Next, in the harness routing structure of the first embodiment; the first protector 51's upper portion located near power control unit 3 is fixed to vehicle body 45, the first protector 51's lower portion located near pound subframe 46 is made to be free from the fastening to vehicle body 45, and the non-protector portion of high voltage harness H2 from the lower end of first protector 51 to the second protector 52 is covered by the corrugated tube 53 having a deformation following capability.

For example, if the non-protector portion of high voltage harness H2 from the lower end of first protector 51 up to the second protector 52 is not covered by corrugated tube 53, namely if the high voltage harness H2 is directly exposed; the high voltage harness H2 has flexible points and not-flexible (hard) points therein or flexible directions and not-flexible directions for bending, in accordance with a relation between an acting direction of bending deformation force and an arrangement of two high-voltage wires (harnesses) (e.g., in vertically parallel arrangement or in transversely parallel arrangement). Due to this, the deformation force is concentrated on the flexible points so that the harness H2 is partially deformed. In such a case, there is a possibility that the harness H2's deformation following capability serving for the oscillation absorption becomes inferior. Further in the case where almost the same position of harness H2 is deformed repeatedly; this portion tends to reach its breaking limit, and hence the durability becomes inferior.

In contrast, since the periphery of the non-protector portion of high voltage harness H2 between the lower end of first protector 51 and the second protector 52 is covered with the corrugated tube 53 in the harness routing structure of the first embodiment, a moderate whole deformation of harness H2 is produced by the corrugated tube 53. Accordingly as compared to the above comparative case in which the high voltage harness H2 is directly exposed; the deformation following capability serving for absorbing the oscillation or vibration can be enhanced, and also a duration reliability can be improved.

Next, in the harness routing structure of the first embodiment; the portion of high voltage harness H2 from the lower end of the first protector 51 up to the second protector 52, namely the portion not enclosed with the protector and instead enclosed with corrugated tube 53 is fixed on the bracket 55 fixed on the pound subframe 46, at the vehicle-inner position beyond (the front bar of) pound subframe 46.

Figure 13:
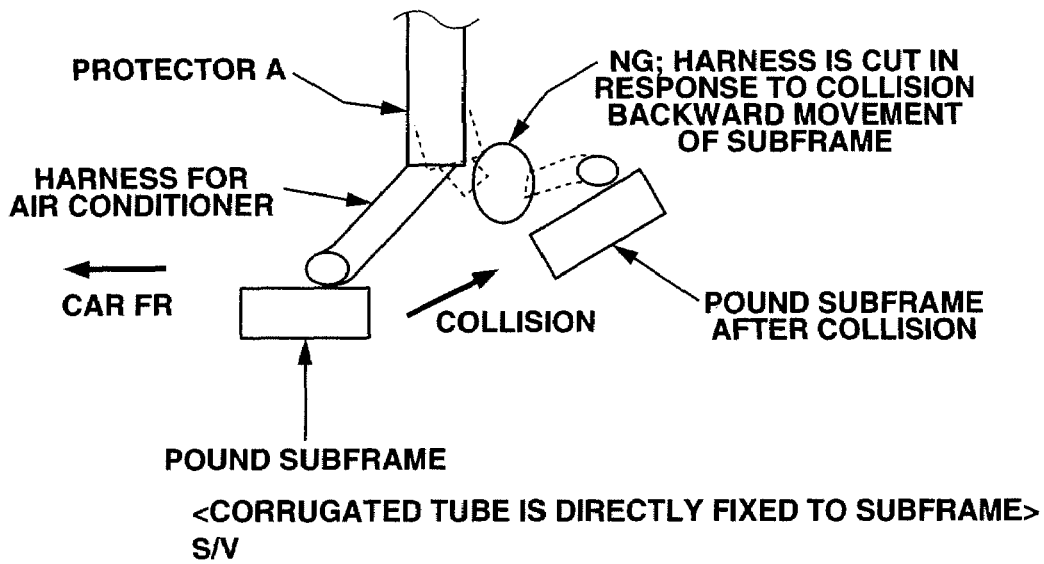
FIG. 13 is a view explaining a problem in the case where a corrugated tube covering the high voltage harness is directly fixed to a pound subframe.

For example, if the high voltage harness covered with corrugated tube is directly fixed on the pound subframe, the corrugated tube is made to move backward in response to the collision backward displacement of pound subframe at the time of vehicle collision, as shown in FIG. 13. Thereby, the high voltage harness is cut or disconnected at the lower end of first protector.

Figure 14:
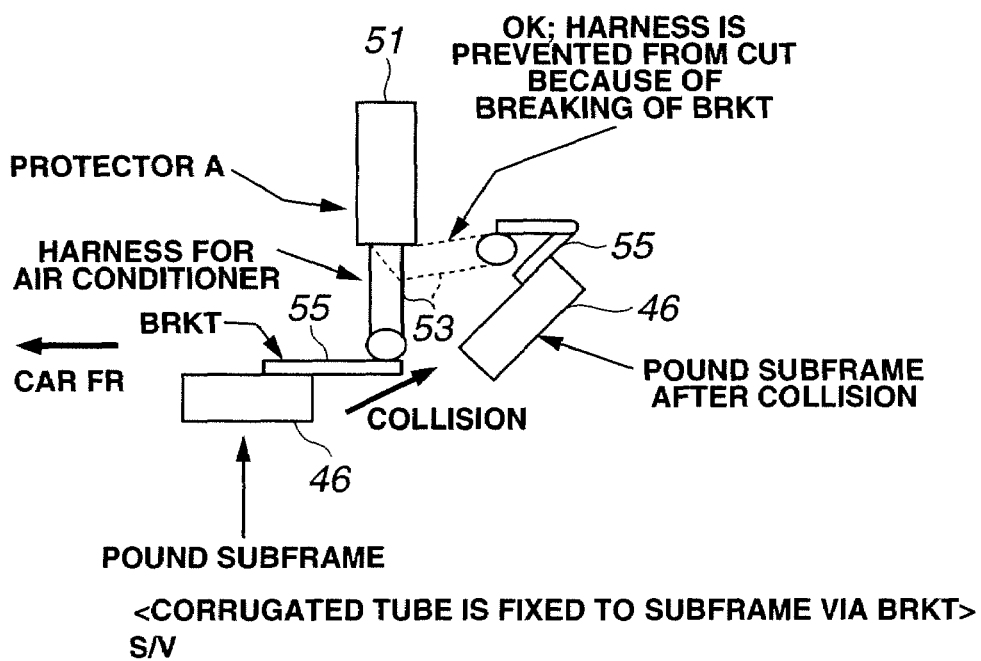
FIG. 14 is a view explaining a preventing operation for a cut of high voltage harness in the high-voltage harness routing structure of the first embodiment.
Figure 15:
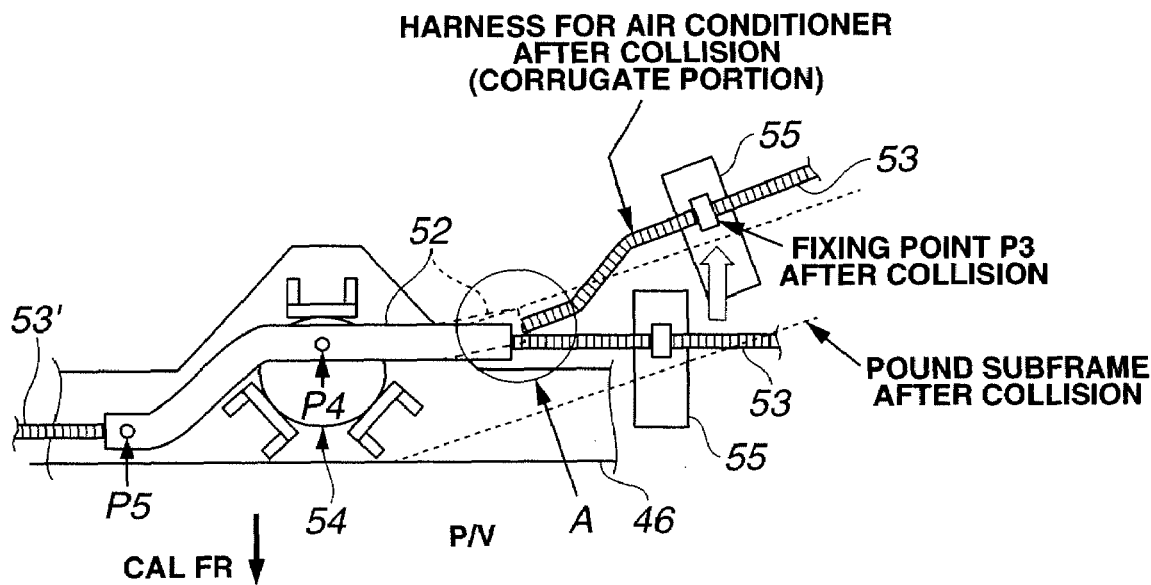
FIG. 15 is a view explaining a protecting operation for the high voltage harness at the time of collision in the high-voltage harness routing structure of the first embodiment.

In contrast, since the corrugated tube 53 through which high voltage harness H2 is inserted is fixed through the bracket 55 fixed on pound subframe 46 in the first embodiment, a tip portion of bracket 55 is bent or broken even if the backward displacement of pound subframe 46 occurs at the time of vehicle collision as shown in FIG. 14. Accordingly, the high voltage harness H2 can be prevented from being cut. Namely at the time of collision, a part of collision energy is absorbed by the bending or breaking of bracket 55. Further since the bent bracket 55 adjusts a distance between corrugated tube 53 and pound subframe 46 to be enlarged, the corrugated tube 53 is prevented from being pulled beyond the limit of tolerance by the pound subframe 46.

Next, in the harness routing structure of the first embodiment; when the second protector 52 is divided into the electrical compressor unit A/CON side part and the power control unit 3 side part relative to the vehicle-width direction, the electrical compressor unit side part is directly fixed on the pound subframe 46 and the power control unit side part is free from the fastening to pound subframe 46. Further in the portion extending in the vehicle-width direction along pound subframe 46 among the above-mentioned portion enclosed with corrugated tube 53, the corrugated tube 53 is fixed to pound subframe 46 at the fixing point P3 located apart from the end surface of second protector 52 in the vehicle-width direction by the length L necessary to follow the deformation of pound subframe 46. Since the power control unit side part of second protector 52 is free from the fastening to pound subframe 46 as mentioned above, this power control unit side part of second protector 52 can follow or respond to the movement of corrugated tube 53 as shown in "A" region of FIG. 15 even if the corrugated tube 53 is made to move in the vehicle-rear direction at the time of collision. Moreover, since the fixing point P3 to pound subframe 46 is set on the corrugated tube 53 but not on the second protector 52, and is located apart from the end surface of second protector 52 by the length L necessary to follow the deformation of pound subframe 46; the flexible portion covered with corrugated tube 53 can follow even if the pound subframe 46 is deformed at the time of collision. Therefore, in the case where the pound subframe 46 is made to move in the vehicle-rear direction due to its deformation at the time of collision as shown by a state change from solid lines to dotted lines of FIG. 15; the flexible corrugated tube 53 moves and alters its own shape to follow the deformation of pound subframe 46. Then, the fastening-free power-control-unit side part of second protector 52 is deformed to follow the following movement of corrugated tube 53, and thereby the second protector 52 can be prevented from being broken.

Next, in the harness routing structure of the first embodiment; the portion dropping from the lower end of first protector 51 among the high-voltage harness H2's portion enclosed with corrugated tube 53 is made to drop in the direction slanted toward the vehicle outside from the vertical direction, and such a slanting angle θ toward the vehicle outside is set so as to allow the corrugated tube 53 to keep its extra length capable of following the movement of pound subframe 46 even if the pound subframe 46 is relatively moved in up-down direction after the vehicle collision.

Figure 16:
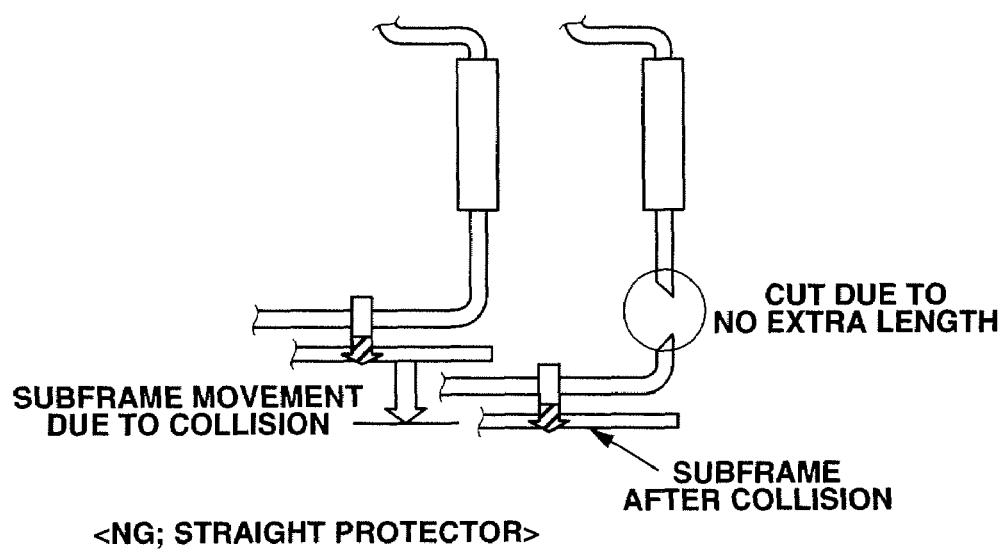
FIG. 16 is a view explaining a problem in the case where an extra length of corrugated tube is not provided in a high-voltage harness routing structure.

For example, if the corrugated tube's portion dropping from the lower end of the first protector is arranged to drop right down so as not to have its extra length, the corrugated tube is cut or broken due to the absence of the extra length when the pound subframe is relatively moved downwardly after the vehicle collision as shown in FIG. 16.

Figure 17:
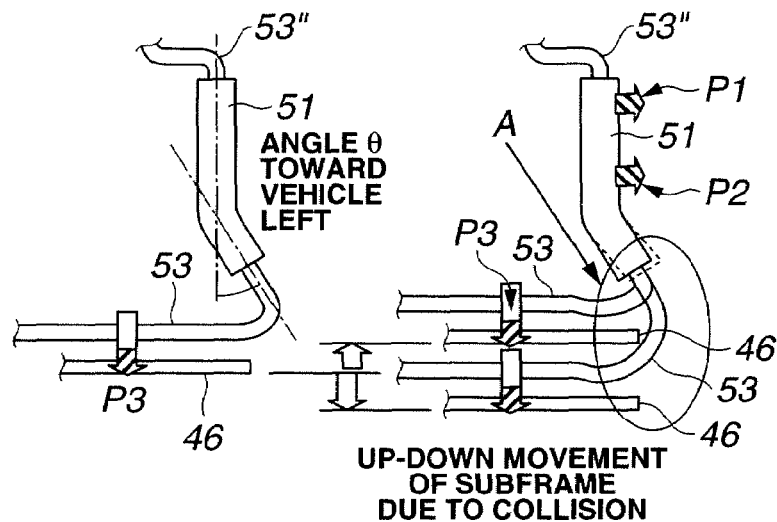
FIG. 17 is a view explaining a cut preventing operation produced by the extra length of corrugated tube when the pound subframe moves in an up-down direction, in the high-voltage harness routing structure of the first embodiment.

In contrast in the first embodiment, since the corrugated tube 53's portion dropping from the lower end of first protector 51 is arranged so as to allow the corrugated tube 53 to keep its extra length capable of following the movement of pound subframe 46 even if the pound subframe 46 is relatively moved in up-down direction after the vehicle collision; the extra length of corrugated tube absorbs the movement (oscillation) of pound subframe 46 even if the pound subframe 46 is relatively moved in the up-down direction after the collision as shown in "A" region of FIG. 17. Thereby, the cut of high voltage harness H2 can be prevented. It is noted that the first protector 51 can be supported by the above-mentioned two fixing points P1 and P2 without fixing the lower end of first protector 51, because the oscillation input transmitted from the pound subframe 46 to the lower end of first protector 51 acts in the up-down direction of vehicle. Moreover, the first protector 51 is prevented from being worn out by the up-down oscillation input transmitted by the corrugated tube 53, because the lower end of first protector 51 is free from the fastening.

Next, in the harness routing structure of the first embodiment; the above-described driving power unit is the hybrid power unit HEV-PU including the transversely mounted engine E and two motor/generators MG1 and MG2 which are provided as driving sources. Moreover, the above-described electric power distribution unit is the power control unit 3 including two functions of the inverter function and the electric power distribution function. In the inverter function; direct current derived from battery 4 is converted into alternating current for motor/generator MG1 or MG2 during the power running, and alternating current generated by motor/generator MG1 or MG2 is converted into direct current for battery 4 during the regenerating. In the electric power distribution function; the direct current derived from battery 4 is distributed to the electrical auxiliary unit through the high voltage harness H2. Moreover, the above-described electrical auxiliary unit is the electrical compressor unit A/CON serving to drive the compressor by using a motor. Therefore, when connecting the power control unit 3 with the electrical compressor unit A/CON by using the high voltage harness H2; the routing structure for high voltage harness H2 can be provided in which both of the high protective performance for high voltage harness H2 and the oscillation absorption of high-voltage harness H2 can be achieved without affecting the drive performance while preventing the lifetime reduction and damage of high-voltage harness H2, in the space of front end portion of hybrid vehicle which is very narrow and very restrained.

[Operations and Benefits of Pound Subframe Routing of High voltage Harness H2]

Next, operations and benefits of the pound subframe routing structure of high voltage harness H2 in the first embodiment will now be explained referring to FIGS. 18 to 23.

Figure 18:
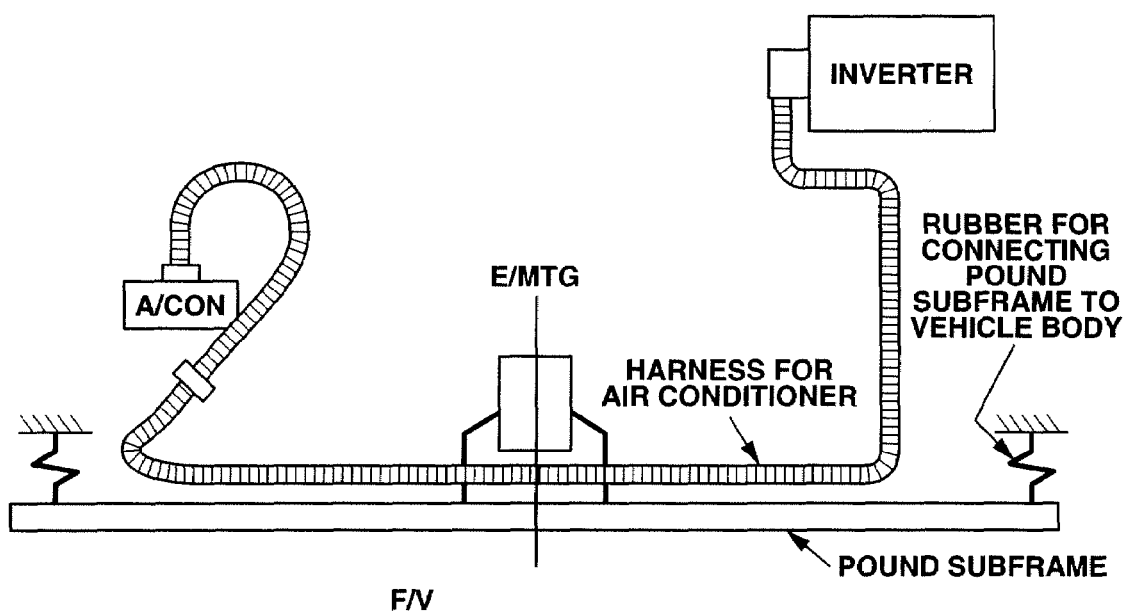
FIG. 18 is a view explaining one structural example of whole routing in the case where a high voltage harness is routed to pass along the pound subframe in front of the engine mount.
Figure 19A:
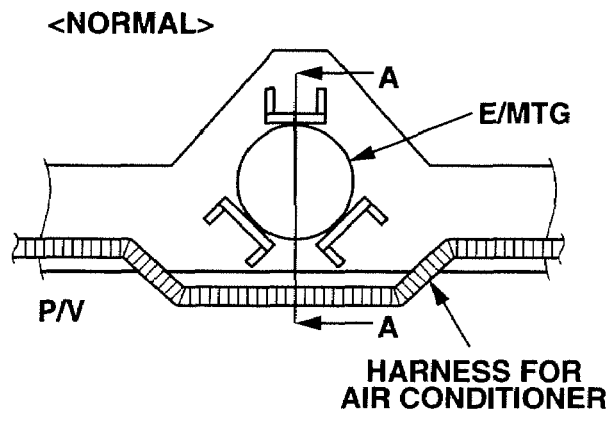
FIGS. 19A to 19D are views explaining a problem in the case where the high voltage harness is routed to pass along the pound subframe in front of the engine mount.
Figure 19B:
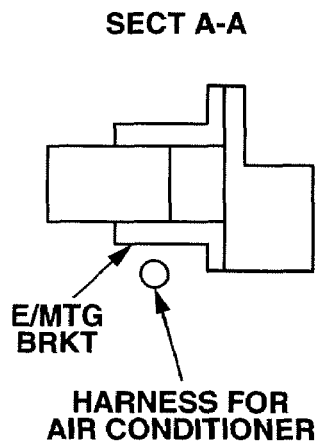
Figure 19C:
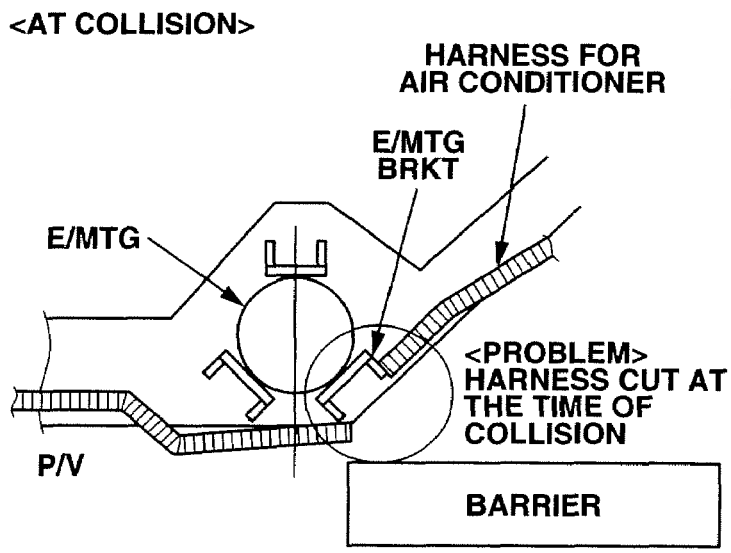
Figure 19D:
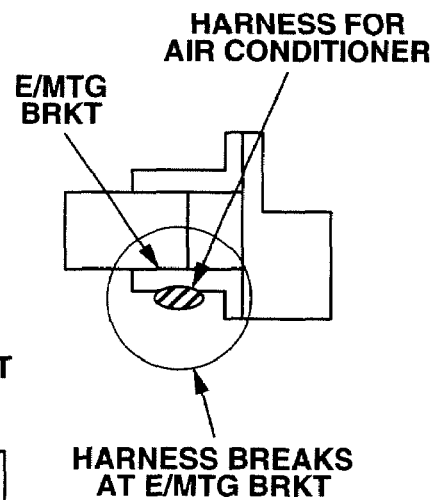
Figure 20:
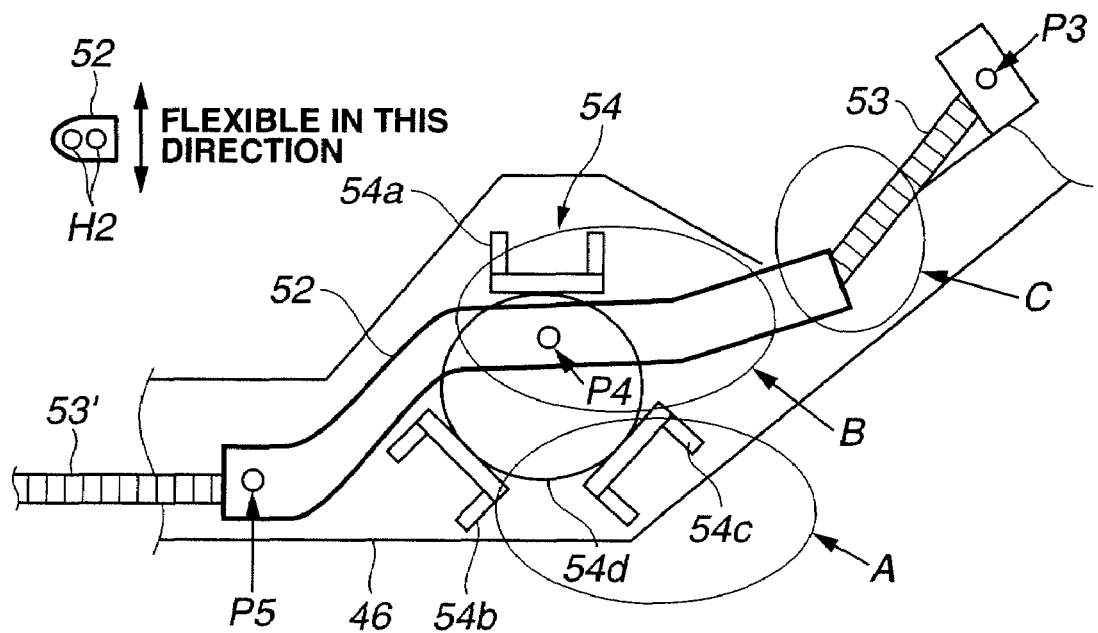
FIG. 20 is a view explaining an operation at the time of collision in the routing structure that the high voltage harness is passed through a space formed in the engine mount in the first embodiment.

For example, in the case where the high voltage harness for the electric compressor is routed on the pound subframe and the front engine mount exists on the pound subframe when considering a layout inside a hybrid vehicle; it is a convincing way to pass the high voltage harness through a space in front of the front engine mount which is located to the vehicle-outer side beyond the front engine mount as shown in FIG. 18. In such a case, there is the following problem. Namely, since the high voltage harness for electric compressor is routed in front of the front engine mount as shown in FIGS. 19A and 19B, the high voltage harness moves backward due to the radiator located in front thereof at the time of frontal collision and then the high voltage harness is cut while winding around an engine mount bracket as shown in FIGS. 19C and 19D. It is noted that FIG. 19B is a section view of FIG. 19A taken along a line A-A, in the similar manner as a relation of FIGS. 19C and 19D.

In contrast, in the harness routing structure of the first embodiment; the routing path of high voltage harness H2 is the detour path causing high-voltage harness H2 to extend along the pound subframe 46 in the vehicle-width direction, and the high-voltage harness H2 covered with second protector 52 is passed through the space S formed in the engine mount 54. Therefore, the high voltage harness H2 covered with second protector 52 comes to be capable of being certainly protected from the cut or break by making use of the engine mount 54 at the time of collision, while preventing the damage and the lifetime reduction of high voltage harness H2 and not affecting the drive performance of vehicle.

Namely in the high-voltage harness routing structure of the first embodiment, as the routing path of high-voltage harness H2 between the connecting terminal of power control unit 3 and the connecting terminal of electrical compressor unit A/CON, the high voltage harness H2 drops toward the pound subframe 46 from the connecting terminal of power control unit 3, and then extends along the pound subframe 46 in the vehicle-width direction. Therefore, since the high-voltage harness routing structure of this embodiment is different from the comparative case in which the detour path that the high voltage harness is passed at the upper position of the space behind the power unit is employed; the air intake duct of engine does not exist on or near the detour path of this embodiment. Accordingly, the high-voltage harness routing structure of this embodiment does not cause the reduction in drive performance such as the engine output-power reduction. Further in the detour path of this embodiment, the high voltage harness H2 does not exist at the position between the hybrid power unit HEV-PU and a radiator-core support, and thereby the damage of high voltage harness H2 can be prevented at the time of frontal collision. Further in the detour path of this embodiment, the harness H2 is passed in the vehicle-width direction through the space formed under the hybrid power unit HEV-PU, so as to avoid the proximity of the engine exhaust system having a tendency to reach a high temperature. Hence, the lifetime reduction of high voltage harness H2 can be prevented.

Moreover, at the mount brackets 54a, 54b, and 54c of engine mount 54 provided on the middle of pound subframe 46 in the vehicle-width direction, the space S is formed by placing the mount main body 54d apart from the upper surface of pound subframe 46. Through this space S provided in engine mount 54, the high voltage harness H2 enclosed with second protector 52 is passed. Therefore, the mount brackets 54a, 54b, and 54c of engine mount 54 serve as a rigid-body barrier for directly receiving an externally applied impactive force. Accordingly, even if the radiator 47 displaced backward at the time of frontal collision interferes with the engine mount 54, the second protector 52 and high voltage harness H2 existing inside the rigid-body barrier (=mount brackets 54a, 54b, and 54c) are certainly protected from being damaged or cut, as shown in "A" region of FIG. 20. In particular, even if the radiator 47 is displaced backward at the time of frontal collision, the radiator 47 is received by the mount bracket 54c, and thereby the second protector 52 is guarded as shown in "B" region of FIG. 20.

As a result, the high voltage harness H2 covered with second protector 52 can be certainly protected from its cut or break by making use of the engine mount 54 at the time of collision, while preventing the damage and the lifetime reduction of high voltage harness H2 and not affecting the drive performance.

Next, in the harness routing structure of the first embodiment; the second protector 52 inserted through the space S formed in the engine mount 54 is secured to the pound subframe 46 at the fixing point P4 located on the center line CL drawn in the front-rear direction via the center O of engine mount 54.

For example, if the left portion of the protector is shifted (offset) by input force under the case where the high voltage harness is routed in front of the engine mount, namely if a left offset input occurs; the protector is damaged or cut due to the interference with the mount bracket located to the left side. Also if the right portion of the protector is shifted by input force, namely if a right offset input occurs; the protector is damaged or cut due to the interference with the mount bracket located to the right side.

In contrast in the first embodiment; since the second protector 52 is fixed to the pound subframe 46 at the fixing point P4 located on the center line CL drawn in the front-rear direction via the center O of engine mount 54, the second protector 52 can be credibly prevented from being damaged or cut even if the left or right offset input occurs.

Reason 1

Figure 21:
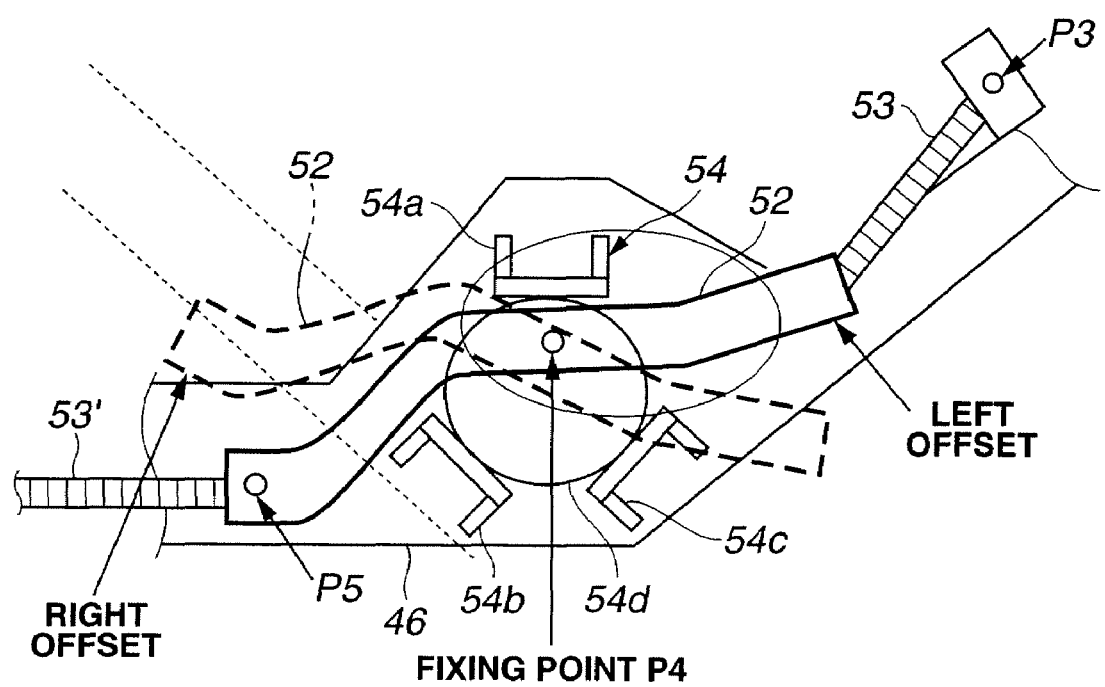
FIG. 21 is a view explaining an operation at the time of offset collision in the routing structure that the high voltage harness is passed through the space formed in the engine mount in the first embodiment.

Since the second protector 52 holds on at the fixing point P4 (i.e., retains its position on the fixing point P4), the second protector 52 itself is not sandwiched by the first mount bracket 54a as shown in FIG. 21.

Reason 2

Since the second protector 52 contacts or hits the first mount bracket 54a by surface contact even if the second protector 52 is rotated around fixing point P4 at the time of the above-mentioned offset input; the second protector 52 is not broken, as shown by solid and dotted lines of FIG. 21.

Next, in the harness routing structure of the first embodiment; when the second protector 52 passed through the space S formed in engine mount 54 is divided into the electrical compressor unit A/CON side part and the power control unit 3 side part relative to the vehicle-width direction for explanatory purpose, the power-control-unit-side part is made to be free from the fastening to pound subframe 46 and is placed at the vehicle-inner position beyond the pound subframe 46 relative to the front-rear direction and moreover the two high-voltage harnesses H2 are arranged in vertically parallel with each other (so as to overlap with each other as viewed from the top) within the second protector 52.

For example, if the power-control-unit-side part of the second protector is fixed to the pound subframe, and the two high-voltage harnesses within the second protector are arranged in laterally parallel with each other (so as to overlap with each other as viewed in the lateral direction); the second protector has a lower degree of flexibility in front-rear directional deformation due to the lateral arrangement of these two high-voltage harnesses, and further the second protector is pulled in response to the deformation of pound subframe in the case where the pound subframe is deformed in the vehicle-rear direction at the time of frontal collision and the like. Accordingly, the second protector might be broken.

In contrast in the first embodiment; the power-control-unit-side part of second protector 52 is made to be free from the fastening to pound subframe 46 and the two high-voltage harnesses within second protector 52 are arranged in vertically parallel with each other. Therefore, the second protector 52 is not pulled at the time of frontal collision, and has a sufficient flexibility in the front-rear directional deformation because of the vertical arrangement of high voltage harnesses H2, as shown in "C" region of FIG. 20. Accordingly, the second protector 52 can be prevented from being broken.

Next, in the harness routing structure of the first embodiment; the mount main body 54d is supported at three points by the first mount bracket 54a placed at the relatively vehicle-inner position of the periphery of mount main body 54d, and the second mount bracket 54b and third mount bracket 54c each placed at the relatively vehicle-outer position of the periphery of mount main body 54d with respect to the front-rear direction. Then, the second protector 52 is placed between the center O of engine mount 54 and the first mount bracket 54a.

Figure 22:
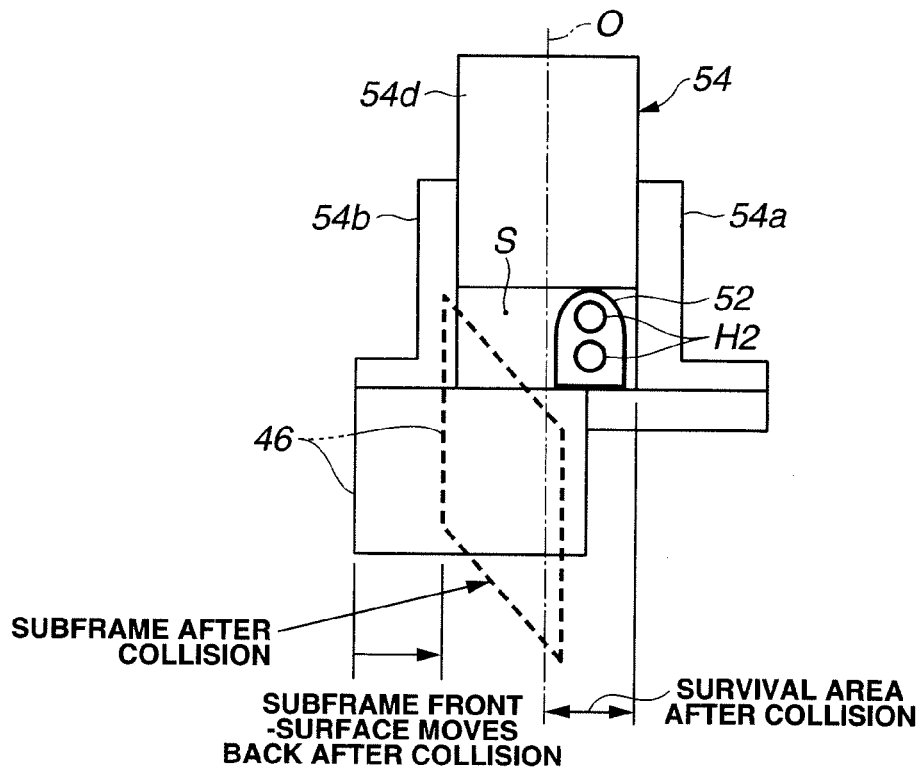
FIG. 22 is a view explaining an operation at the time of frontal collision in the routing structure that the high voltage harness is passed through the space formed in the engine mount in the first embodiment.

For example, if the second protector is placed at a vehicle-front position beyond the center of the engine mount; the pound subframe is crushed so as to deform its (front bar's) shape from a square-shaped cross section to a parallelogram-shaped cross section at the time of frontal collision as shown in FIG. 22, and at this time, the vehicle-front portion anterior to the center of engine mount falls into an interference area due to the collision, and thereby the second protector might be crushed and broken.

In contrast in the first embodiment; the second protector 52 is placed between the center O of engine mount 54 and the first mount bracket 54a. Therefore, even if the pound subframe 46 is crushed so as to deform its shape from the square-shaped cross section to the parallelogram-shaped cross section at the time of frontal collision as shown by solid and dotted lines of FIG. 22, the setting area of second protector 52 falls into a survival (relatively non-damaged) area after the collision, and thereby the crushing damage of second protector 52 can be certainly prevented.

Next, in the harness routing structure of the first embodiment; the second protector 52 passed through the space S provided in engine mount 54 is formed with edges R in the second protector 52's upper surface facing the bottom surface of mount main body 54d under the passed state of second protector 52.

Figure 23A:
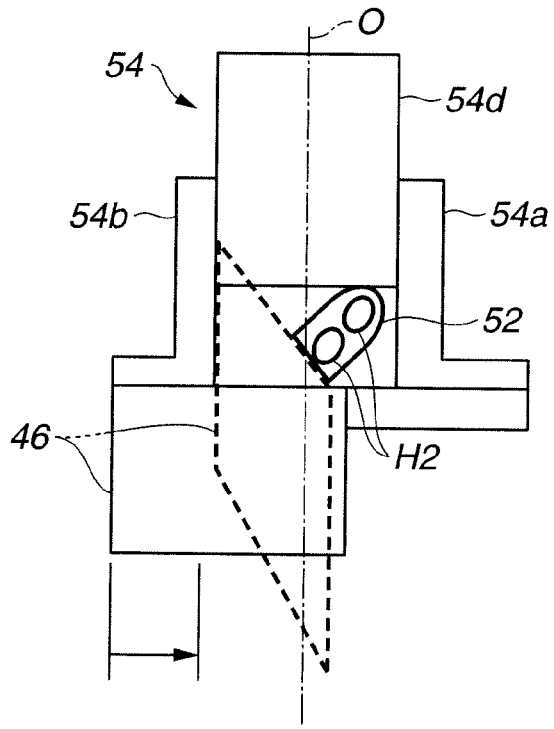
FIGS. 23A and 23B are views explaining an operation at the time of heavier frontal collision in the routing structure that the high voltage harness is passed through the space formed in the engine mount in the first embodiment.

For example, when the pound subframe is crushed so as to deform its shape from the square-shaped cross section to the parallelogram-shaped cross section at the time of heavier frontal collision as shown in FIG. 23A; the survival area is narrowed, and hence the second protector might interfere (contact or hit to be damaged) with the engine mount even in the case where the second protector is placed at the vehicle-rear position beyond the center O of the engine mount.

Figure 23B:
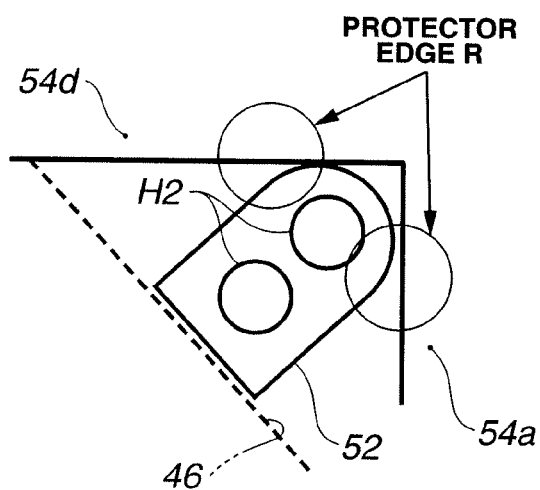

In the first embodiment; since the edges R are provided in the upper surface of second protector 52, even if the pound subframe 46 is crushed so as to deform its shape from the square-shaped cross section to the parallelogram-shaped cross section due to the heavier frontal collision as shown in FIG. 23A, the second protector 52 is alive so as to fit in a triangle space formed by the bottom surface of mount main body 54d, the first mount bracket 54a, and the pound subframe 46 as shown in FIG. 23B. Accordingly the break of second protector 52 can be prevented.

Next, in the harness routing structure of the first embodiment; the above-described driving power unit is the hybrid power unit HEV-PU including the transversely mounted engine E and two motor/generators MG1 and MG2 which are provided as driving sources. Moreover, the above-described electric power distribution unit is the power control unit 3 including two functions of the inverter function and the electric power distribution function. In the inverter function; direct current derived from battery 4 is converted into alternating current for motor/generator MG1 or MG2 during the power running, and alternating current generated by motor/generator MG1 or MG2 is converted into direct current for battery 4 during the regenerating. In the electric power distribution function; the direct current derived from battery 4 is distributed to the electrical auxiliary unit through the high voltage harness H2. Moreover, the above-described electrical auxiliary unit is the electrical compressor unit A/CON serving to drive the compressor by using a motor. Therefore, when connecting the power control unit 3 with the electrical compressor unit A/CON by using the high voltage harness H2 in the space of front end portion of hybrid vehicle which is very narrow and very restrained; the routing structure for high voltage harness H2 can be provided in which the damage or cut of high voltage harness H2 covered with the second protector 52 can be certainly prevented by virtue of the engine mount 54 at the time of collision, while preventing the lifetime reduction and damage of high voltage harness H2 without affecting the drive performance during the normal time except at the time of collision.

[Operations and Benefits of Radiator Shroud Routing of High voltage Harness H2]

Next, operations and benefits of the radiator shroud routing structure of high voltage harness H2 in the first embodiment will now be explained referring to FIGS. 24 to 28.

Figure 24:
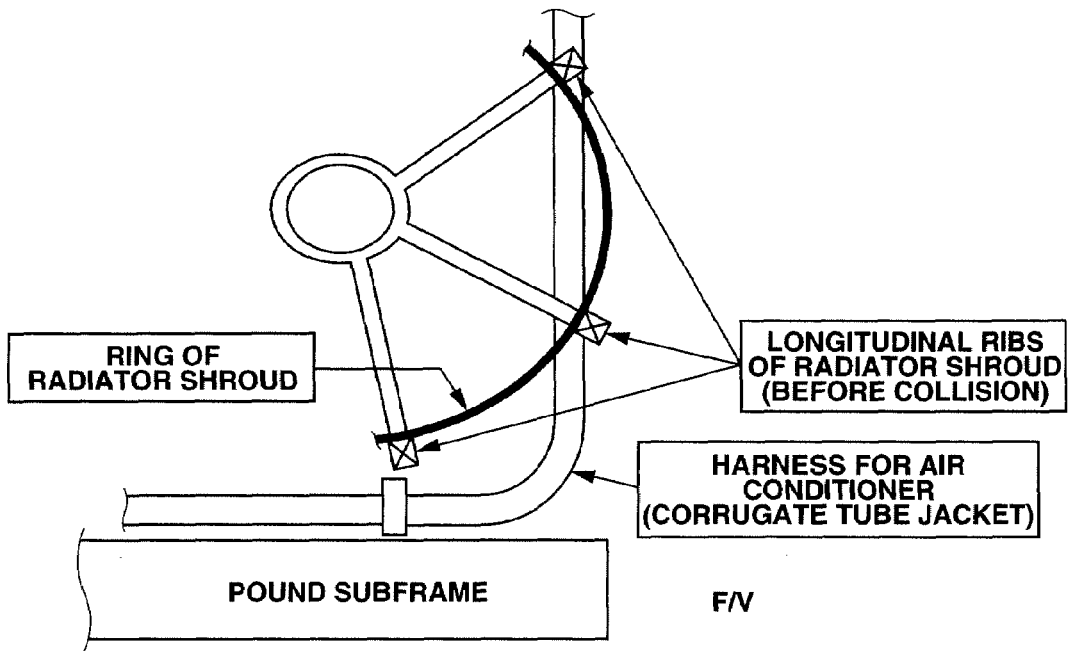
FIG. 24 is a view explaining one structural example in the case where a high voltage harness is routed to pass through a position located behind longitudinal ribs of a radiator shroud.
Figure 25:
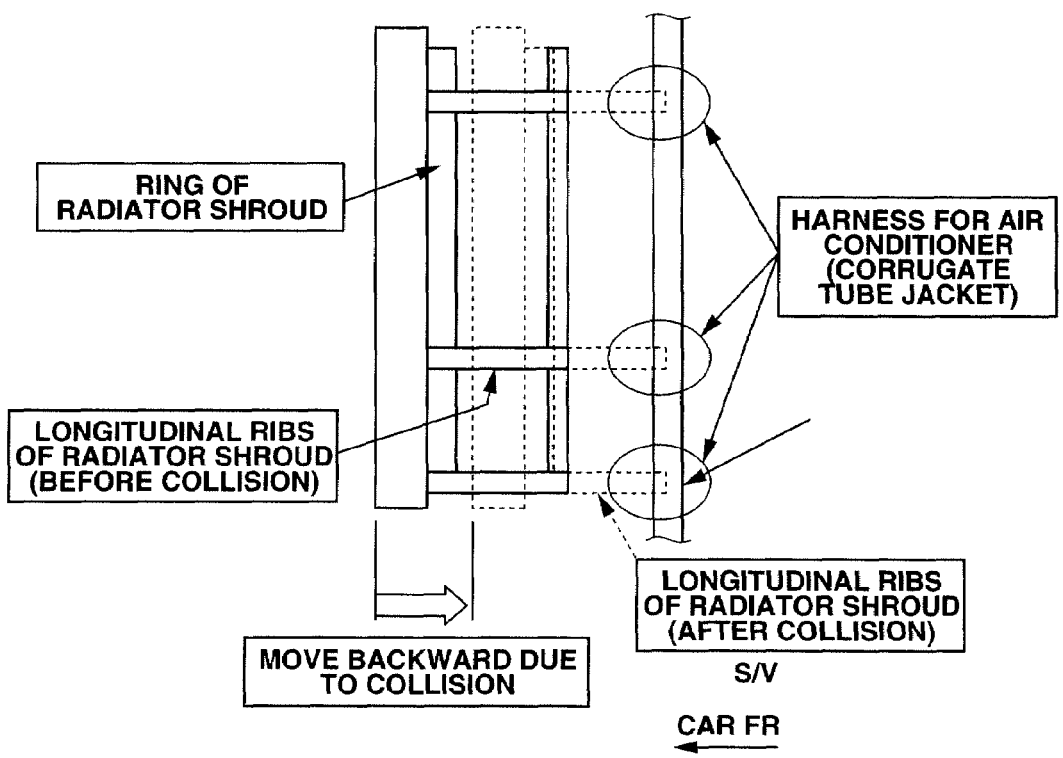
FIG. 25 is a view explaining a problem in the case where the high voltage harness is routed to pass through the position located behind longitudinal ribs of the radiator shroud.

For example, in the case where the high voltage harness for electric compressor is routed on the pound subframe and the radiator shroud exists at the vehicle-front position between the inverter and the pound subframe in a layout inside the hybrid vehicle; the high voltage harness needs to be routed behind the longitudinal ribs of radiator shroud with an effective layout taken into account as shown in FIG. 24. In such a case, there is the following problem. Namely, since the high voltage harness for electric compressor is routed at the position behind the longitudinal ribs of radiator shroud as shown in FIG. 25, the longitudinal rib directly hits the high voltage harness when the radiator shroud is displaced backward due to the frontal collision. Accordingly the covering of high voltage harness is injured.

In contrast in the harness routing structure of the first embodiment; the routing path of high voltage harness H2 employs the detour path causing high voltage harness H2 to extend along pound subframe 46 in the vehicle-width direction, then the high voltage harness H2 covered with first protector 51 is routed in the area set by avoiding the existing area of the fan motor and the existing area of longitudinal ribs of radiator shroud 48. Therefore, the damage of high voltage harness H2 covered with the first protector 51 can be certainly prevented by positively avoiding the high-strength portion(s) of radiator shroud 48 at the time of collision, while preventing the lifetime reduction and damage of high voltage harness H2 also during the normal running without affecting the drive performance.

Namely in the harness routing structure of the first embodiment; the routing path of harness H2 between the connecting terminal of power control unit 3 and the connecting terminal of electrical compressor unit A/CON employs the detour path in which the harness H2 drops toward the pound subframe 46 from the connecting terminal of power control unit 3 and then extends along the pound subframe 46 in the vehicle-width direction. Therefore, since the high-voltage harness routing structure of this embodiment is different from the comparative case employing the detour path in which the high voltage harness is passed through the upper position of the vehicle-rear side of the power unit; the air intake duct of engine does not exist on or near the detour path of this embodiment. Accordingly, the high-voltage harness routing structure of this embodiment does not cause the reduction in drive performance such as the engine output-power reduction. Further in the detour path of this embodiment, the high voltage harness H2 does not exist at the position between the hybrid power unit HEV-PU and the radiator-core support, and thereby a damage of high voltage harness H2 can be prevented at the time of frontal collision. Further in the detour path of this embodiment, the harness H2 is passed in the vehicle-width direction through the clearance formed under the hybrid power unit HEV-PU, so as to avoid the proximity of engine exhaust system having a tendency to reach a high temperature. Hence, the lifetime reduction of high voltage harness H2 can be prevented.

Figure 26:
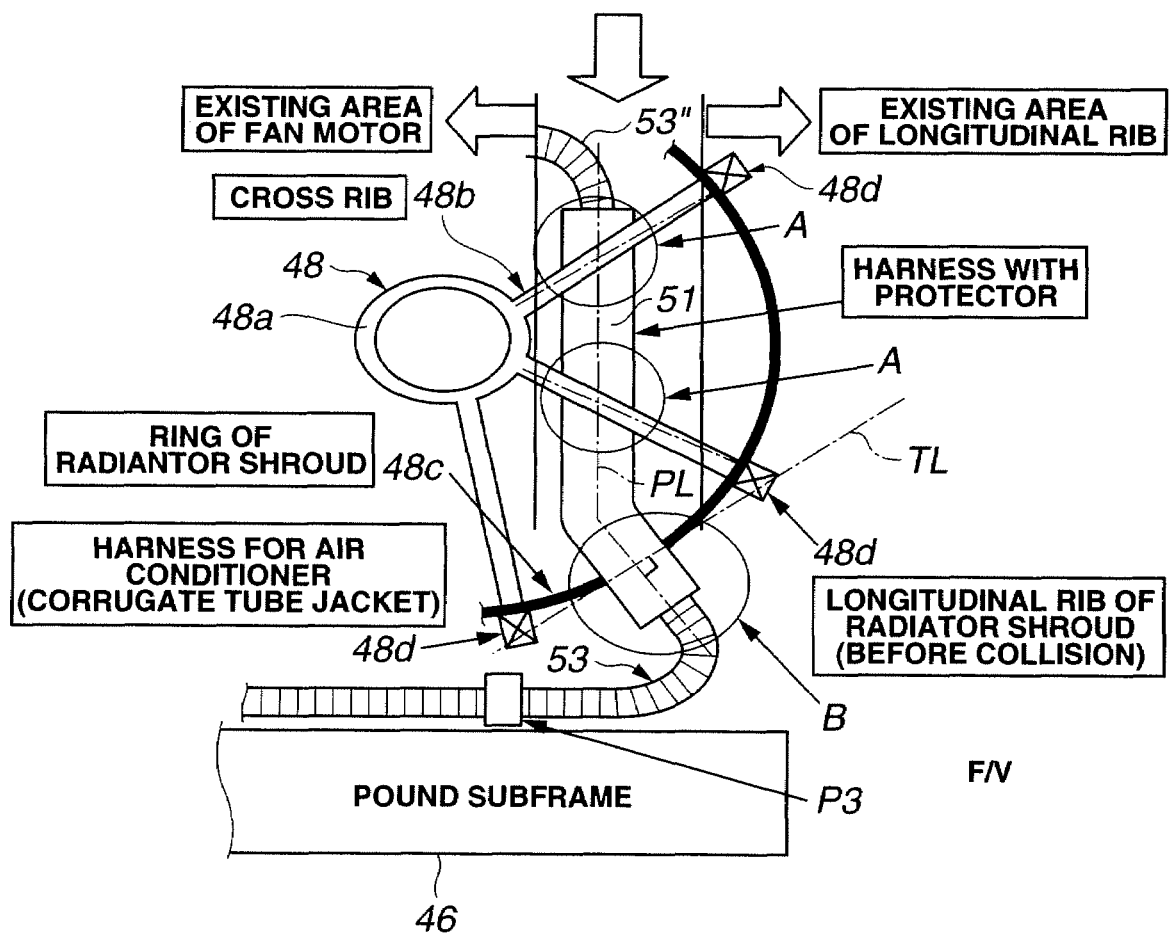
FIG. 26 is a view explaining an operation in the routing structure that the high voltage harness is passed so as to avoid an existing area of fan motor and an existing area of longitudinal ribs of radiator shroud in the first embodiment.

Moreover, among the high-voltage harness H2's portion dropping toward the pound subframe 46, the high-voltage harness H2's portion covered by first protector 51 is routed in the area except the existing area of fan motor and the existing area of longitudinal ribs of radiator shroud 48. Hence, the high-voltage harness H2 enclosed by first protector 51 is routed so as to positively avoid the high-strength portions of radiator shroud 48 (i.e., existing area of fan motor and existing area of longitudinal ribs) as shown in FIG. 26. Accordingly, the first protector 51 is not sandwiched between the high-strength portion of radiator shroud 48 and the hybrid power unit HEV-PU even if the radiator shroud 48 is displaced toward the hybrid power unit HEV-PU at the time of collision, and thereby the high voltage harness H2 covered with first protector 51 is certainly protected from being damaged.

As the result, the high voltage harness H2 covered with first protector 51 can be certainly protected from being damaged by positively avoiding the high-strength portions of radiator shroud 48 at the time of collision, while preventing the lifetime reduction and damage of high voltage harness H2 without affecting the drive performance.

Next, in the harness routing structure of the first embodiment; the high-voltage harness H2's portion covered by first protector 51 is laid out to cause the routing axis PL of first protector 51 to intersect with the two cross ribs 48b of radiator shroud 48 at angles except right angle as viewed from the front.

For example, if the high voltage harness covered by the first protector is laid out so as to intersect with the cross rib of radiator shroud at right angle; a contact area (dimension) A between the protector and the cross rib of radiator shroud becomes a rectangular shape in cross-section as shown in FIG. 27A, and thereby the pressure (contact pressure per unit area) applied at the time of collision becomes relatively high.

In contrast in the first embodiment; since the high-voltage harness H2 covered by first protector 51 is arranged to cross with the two cross ribs 48b of radiator shroud 48 at the angles except right angle as shown in "A" regions of FIG. 26, a contact area B (>A) between the first protector 51 and the cross rib 48b of radiator shroud 48 becomes a parallelogram shape in cross-section as shown in FIG. 27B. Accordingly, the pressure (contact pressure per unit area) at the time of collision can be reduced, and thereby the first protector 51 can be protected from the break or the like at the time of vehicle collision.

Next, in the harness routing structure of the first embodiment; the high voltage harness H2 covered by the first protector 51 is arranged to cause the protector's routing axis PL to cross with the tangent TL of the ring 48c of radiator shroud 48 at right angle.

For example, if the high voltage harness covered by the first protector is arranged to cross with the tangent of the ring of the radiator shroud at an angle except right angle; a contact area (dimension) B between the protector and the ring of the radiator shroud becomes a distortion arc shape in cross-section as shown in FIG. 28B, and the pressure (contact pressure per unit area) applied at the time of collision becomes relatively low so that the protector tends to be easily damaged by the ring.

In contrast in the first embodiment; since the high voltage harness H2 covered by first protector 51 is arranged to cross with the ring 48c of radiator shroud 48 at right angle as shown in "B" region of FIG. 26, a contact area A (<B) between the first protector 51 and the radiator shroud ring 48c becomes a symmetrical arc shape in cross-section as shown in FIG. 28A. Accordingly, the pressure (contact pressure per unit area) applied at the time of collision becomes relatively high, and thereby the ring 48c is positively broken. Therefore, the first protector 51 can be prevented from break and the like.

Next, in the harness routing structure of the first embodiment; in the high-voltage harness H2's portion covered by first protector 51, the upper portion of first protector 51 which is located relatively near power control unit 3 is fixed to vehicle body 45 and then the lower portion of first protector 51 which is located relatively near pound subframe 46 is free from the fastening to vehicle body 45. This first protector's upper portion located near power control unit 3 is made to drop right down, and the first protector's lower portion located near pound subframe 46 is made to drop at the angle θ inclined toward the vehicle outside. Thereby, the high-voltage harness H2's portion covered by the first protector 51 is arranged so as to cross with the cross ribs 48b of radiator shroud 48 at some angles except right angle, and also so as to cross with the tangent TL of the ring 48c of radiator shroud 48 at right angle. Moreover, the high-voltage harness H2's portion dropping from the lower end of first protector 51 at the vehicle-outside-inclined angle θ is coved with the corrugated tube 53. Therefore in the first embodiment, the arrangement causing the high voltage harness H2 covered with first protector 51 to cross with the cross rib 48b of radiator shroud 48 at an angle except right angle and further to cross with the tangent TL of ring 48c at right angle can be achieved, by simply designing the shape of first protector 51 in a dog-leg (elbowed) shape as shown in FIG. 26. Additionally by this design, the corrugated tube 53's portion extending from the lower end of first protector 51 can be made to have its extra length capable of absorbing the up-down movement (oscillation) of pound subframe 46.

Next, in the harness routing structure of the first embodiment; the first protector's lower portion inclined by the angle θ toward the vehicle outside is arranged in a midsection between the circumferentially-adjacent cross ribs 48b and 48b of radiator shroud 48. Therefore, since the structure that positively avoids the interference between first protector 51 and cross rib 48b is employed in the first embodiment as shown in "B" region of FIG. 26, the first protector 51 can be certainly prevented from being sandwiched between cross rib 48b and hybrid power unit HEV-PU at the time of collision.

Next, in the harness routing structure of the first embodiment; the above-described driving power unit is the hybrid power unit HEV-PU including the transversely mounted engine E and two motor/generators MG1 and MG2 which are provided as driving sources. Moreover, the above-described electric power distribution unit is the power control unit 3 including two functions of the inverter function and the electric power distribution function. In the inverter function; direct current derived from battery 4 is converted into alternating current for motor/generator MG1 or MG2 during the power running, and alternating current generated by motor/generator MG1 or MG2 is converted into direct current for battery 4 during the regenerating. In the electric power distribution function; the direct current derived from battery 4 is distributed to the electrical auxiliary unit through the high voltage harness H2. Moreover, the above-described electrical auxiliary unit is the electrical compressor unit A/CON serving to drive the compressor by using a motor. Therefore, when connecting the power control unit 3 with the electrical compressor unit A/CON by using the high voltage harness H2 in the space of front end portion of hybrid vehicle which is very narrow and very restrained; the routing structure for high voltage harness H2 can be provided in which the damage of high voltage harness H2 covered with the first protector 51 can be certainly prevented by positively avoiding the high-rigid portions of radiator shroud 48 at the time of collision, while preventing the lifetime reduction and damage of high voltage harness H2 without affecting the drive performance during the normal running.

Next, the advantages of some structures according to the first embodiment will now be explained below. The following listed advantages can be produced.

(1) According to the high-voltage harness routing structure in the first embodiment: pound subframe 46 is elastically supported by vehicle body 45; hybrid power unit HEV-PU is mounted on pound subframe 46; power control unit 3 is supported by vehicle body 45 and arranged near the upper left end portion of hybrid power unit HEV-PU relative to the vehicle-width direction; electrical compressor unit A/CON is supported by hybrid power unit HEV-PU and arranged near the lower front position of the right end portion of hybrid power unit HEV-PU relative to the vehicle-width direction so as to cause hybrid power unit HEV-PU to be sandwiched between power control unit 3 and electrical compressor unit A/CON; high voltage harness H2 electrically connects power control unit 3 with electrical compressor unit A/CON in the routing path between the connecting terminal of power control unit 3 and the connecting terminal of electrical compressor unit A/CON; the routing path causes high voltage harness H2 to drop from the connecting terminal of power control unit 3 toward pound subframe 46 and then to extend along pound subframe 46 in the vehicle-width direction as the detour path; engine mount 54 includes mount brackets 54a, 54b, and 54c fixed to pound subframe 46 at some point in the vehicle-width direction, and mount main body 54d fixed to mount brackets 54a, 54b, and 54c and arranged apart from the upper surface of pound subframe 46 to form space S between mount main body 54d and pound subframe 46; second protector 52 covers the periphery of at least the high-voltage harness H2's portion extending along pound subframe 46 in the vehicle-width direction and interfering (overlapping) with engine mount 54; and high voltage harness H2 covered by second protector 52 is passed through space S formed in engine mount 54. Accordingly, the high voltage harness H2 covered with second protector 52 comes to be capable of being certainly protected from the cut or break by making use of the engine mount 54 at the time of collision, while preventing the damage and the lifetime reduction of high voltage harness H2 and not affecting the drive performance of vehicle.

(2) Further, the protector 52 passed through space S formed in engine mount 54 is fixed to pound subframe 46 at fixing point P4 located substantially on imaginary center line CL drawn in the front-rear direction via center O of engine mount 54, as viewed in the up-down direction. Accordingly, the second protector 52 can be credibly prevented from being damaged or cut even if the left or right offset input occurs.

(3) Further, the second protector 52 passed through space S formed in engine mount 54 includes the electrical-compressor-unit side portion and the power-control-unit side portion if second protector 52 is imaginarily divided into two portions in the vehicle-width direction; the power-control-unit side portion is free from the fastening to pound subframe 46 and is arranged at a vehicle-inner position beyond the front bar of pound subframe 46 relative to the vehicle front-rear direction; and the two high voltage harnesses H2 are arranged vertically along each other within second protector 52 when extending along pound subframe 46 in the vehicle-width direction. Accordingly, the second protector 52 is not pulled at the time of collision, and is sufficiently flexible in the front-rear direction because of the vertical arrangement of high voltage harnesses H2 conducted inside second protector 52. Hence, the second protector 52 can be prevented from being broken.

(4) Further, the engine mount 54 includes first mount bracket 54a set at the relatively vehicle-inner position of the periphery of mount main body 54d, and second and third mount brackets 54b and 54c set at the relatively vehicle-outer positions of the periphery of mount main body 54d with respect to the front-rear direction; mount main body 54d is supported by first, second, and third mount brackets 54a, 54b, and 54c by means of three-point mounting; and the second protector 52 is located between center O of engine mount 54 and first mount bracket 54a as viewed in the up-down direction. Accordingly, even if (the front bar of) pound subframe is crushed so that a cross section thereof changes from the rectangular shape to a parallelogram shape at the time of frontal collision, the arranging area of second protector 52 falls into the alive area after the collision, and thereby the crushing damage of second protector 52 can be certainly prevented.

(5) Further, the second protector 52 passed through space S formed in engine mount 54 is formed with rounded corners R provided in the protector's upper surface facing the bottom surface of mount main body 54d under the state where the second protector 52 is passed through space S formed in engine mount 54. Accordingly, even if the pound subframe 46 is crushed so as to deform its shape from the square-shaped cross section to the parallelogram-shaped cross section due to the heavier frontal collision, the second protector 52 is alive so as to fit in the triangle space formed by the bottom surface of mount main body 54d, the first mount bracket 54a, and the pound subframe 46. Hence the break of second protector 52 can be prevented.

(6) Further, the driving power unit is the hybrid power unit HEV-PU including the transversely mounted engine E and two motor/generators MG1 and MG2 which are provided as driving sources; the electric power distribution unit is the power control unit 3 including two functions of the inverter function and the electric power distribution function; in the inverter function, direct current derived from battery 4 is converted into alternating current for motor/generator MG1 or MG2 during the power running, and alternating current generated by motor/generator MG1 or MG2 is converted into direct current for battery 4 during the regenerating; in the electric power distribution function, the direct current derived from battery 4 is distributed to the electrical auxiliary unit through the high voltage harness H2; and the electrical auxiliary unit is the electrical compressor unit A/CON serving to drive the compressor by using a motor. Accordingly, in the case where the power control unit 3 is connected with the electrical compressor unit A/CON by using the high voltage harness H2 in the space of front end portion of hybrid vehicle which is very narrow and very restrained; the high-voltage harness routing structure can be provided so that the damage or cut of the high voltage harness H2 covered with second protector 52 is certainly prevented by utilizing engine mount 54 at the time of collision while preventing the lifetime reduction and the damage of high voltage harness H2 without affecting the drive performance during the normal running.

(7) Further, the protector for covering the periphery of high voltage harness H2 is separately divided into first protector 51 covering the periphery of at least a part of the high-voltage harness's portion dropping from the connecting terminal of power control unit 3 toward pound subframe 46, and second protector 52 covering the periphery of at least a part of the high-voltage harness's portion extending along pound subframe 46 in the vehicle-width direction. Accordingly, both of the high protective performance for high voltage harness H2 and the oscillation absorption can be achieved, while preventing the damage and the lifetime reduction of high voltage harness H2 without giving effects to the drive performance.

(8) Further, the first protector 51 includes the upper portion (power-control-unit side portion) fixed to vehicle body 45 and the lower portion (pound-subframe side portion) made to be free from a fastening to vehicle body 45; and the periphery of the high-voltage harness's portion (not-covered by the protector) between the lower end of first protector 51 and second protector 52 is covered by the corrugated tube 53 having a high deformation following capability. Accordingly, the moderate whole deformation of harness H2 can be produced by the corrugated tube 53. Thereby as compared to the case where high voltage harness H2 is directly exposed; the deformation following capability for absorbing the oscillation or vibration can be enhanced, and also the duration reliability can be improved.

(9) Further, the high-voltage harness's portion covered by corrugated tube 53 between the lower end of first protector 51 and the end of second protector 52 is fixed to pound subframe 46 at the vehicle-inner position beyond the front bar of pound subframe 46 through bracket 55 with respect to the vehicle front-rear direction. Accordingly, a (tip) portion of bracket 55 is bent or broken even if the backward displacement of pound subframe 46 occurs at the time of collision. Thereby, high voltage harness H2 can be prevented from being cut.

(10) Further, the second protector 52 includes the electrical-compressor-unit side portion and the power-control-unit side portion if second protector 52 is imaginarily divided into two portions in the vehicle-width direction; the electrical-compressor-unit side portion is fixed directly to pound subframe 46; the power-control-unit side portion is free from a fastening to pound subframe 46; and among the high-voltage harness's portion covered by corrugated tube 53, the portion extending along pound subframe 46 in the vehicle-width direction is fixed to pound subframe 46 at fixing point P3 located apart from the end surface of power-control-unit side portion of second protector 52 in the vehicle-width direction by length L prescribed to follow the deformation of pound subframe 46. Accordingly, in the case where pound subframe 46 is made to move in the vehicle-rear direction due to its deformation, the flexible corrugated tube 53 moves and alters its own shape to follow the deformation of pound subframe 46. Then, the fastening-free power-control-unit side portion of second protector 52 is deformed to follow the movement of corrugated tube 53, and thereby second protector 52 can be prevented from being broken.

(11) Further, among the high-voltage harness's portion covered by corrugated tube 53, the portion dropping from the lower end of first protector 51 is made to drop in the direction slanted toward vehicle outside from the vertical direction relative to the vehicle-width direction by angle θ prescribed to allow corrugated tube 53 to keep its extra length capable of following pound subframe 46 even if pound subframe 46 relatively moves in the up-down direction after collision. Accordingly, the extra length of corrugated tube 53 absorbs the movement (oscillation) of pound subframe 46 even if pound subframe 46 is relatively moved in the up-down direction after the collision, and thereby the cut of high voltage harness H2 can be prevented.

Although the invention has been described above with reference to certain embodiments of the invention, the invention is not limited to the embodiments described above. Modifications and variations of the embodiments described above will occur to those skilled in the art in light of the above teachings.

For example, in the first embodiment, the hybrid power unit HEV-PU including the transversely mounted engine E and the two motor/generators MG1 and MG2 provided as driving sources has been exemplified as one example of driving power unit. However, the driving power unit according to the present invention may be a hybrid power unit composed of an engine and one motor/generator, a power unit composed of only an engine (engine-drive vehicle), a power unit composed of only a motor/generator(s) (electric vehicle), or the like.

For example, in the first embodiment, the power control unit 3 which includes two functions of the inverter function for converting direct current derived from battery 4 into alternating current for motor/generator MG1 or MG2 during the power running and for alternating current generated by motor/generator MG1 or MG2 is converted into direct current for battery 4 during the regenerating, and the electric power distribution function for distributing direct current derived from battery 4 to the electrical auxiliary unit through high voltage harness H2 has been exemplified as one example of electric power distribution unit. However, the electric power distribution unit according to the present invention may be an electric power distribution unit not having the inverter function.

For example, in the first embodiment, the electrical compressor unit A/CON for driving the compressor by using a motor has been exemplified as one example of electrical auxiliary unit. However, the electrical auxiliary unit according to the present invention is not limited to an electrical compressor unit for air conditioner, namely may be any kind of electrical auxiliary unit installed in a vehicle.

For example, in the first embodiment, the two high-voltage wires for conducting direct current have been exemplified as one example of high-voltage harness(es). However, the harness routing structure according to the present invention is also applicable to three high-voltage wires for conducting three-phase alternating current.

INDUSTRIAL APPLICABILITY

For example in the first embodiment, the high-voltage harness routing structure has been applied to the front-wheel-drive hybrid vehicle equipped with the driving power unit in the front position of vehicle. However, the harness routing structure according to the present invention is also applicable to a hybrid vehicle, an engine-drive vehicle, an electric vehicle, or the like which is equipped with a driving power unit irrespective of in the front position of vehicle or in the rear position of vehicle, further irrespective of a front-wheel-drive vehicle or a rear-wheel-drive vehicle. In a word, the harness routing structure according to the present invention is applicable to any kind of vehicle which is equipped with a driving power unit on a subframe elastically supported by a vehicle body and in which an electric power distribution unit and an electrical auxiliary unit installed to sandwich the driving power unit are connected through a harness to each other.

This application is based on prior Japanese Patent Applications No. 2005-325843 filed on Nov. 10, 2005 and No. 2005-325844 filed on Nov. 10, 2005. The entire contents of these Japanese Patent Applications are hereby incorporated by reference.

The scope of the invention is defined with reference to the following claims.

What is claimed is:

1. A high voltage harness routing structure for a vehicle, comprising:
   a subframe elastically supported by a vehicle body;
   a driving power unit mounted on the subframe, the driving power unit including
      a first end portion which is one of right and left end portions of the driving power unit relative to a vehicle-width direction and
      a second end portion which is another of the right and left end portions;
   an electric power distribution unit supported by the vehicle body, and arranged near the first end portion;

an electrical auxiliary unit supported by the driving power unit, and arranged near the second end portion so as to cause the driving power unit to be sandwiched between the electric power distribution unit and the electrical auxiliary unit;

a high voltage harness electrically connecting the electric power distribution unit with the electrical auxiliary unit in a routing path between a connecting terminal of the electric power distribution unit and a connecting terminal of the electrical auxiliary unit, the routing path causing the high voltage harness to drop from the connecting terminal of the electric power distribution unit toward the subframe and then extend along the subframe in the vehicle-width direction;

a driving power unit mount including a mount bracket fixed to the subframe and a mount main body fixed to the mount bracket and arranged apart from an upper surface of the subframe to form a space between the mount main body and the subframe; and a protector that covers a periphery of at least a high voltage harness's portion extending along the subframe in the vehicle-width direction and interfering with the driving power unit mount, the high voltage harness covered by the protector being passed through the space formed in the driving power unit mount.

2. The high voltage harness routing structure as claimed in claim 1, wherein the protector passed through the space formed in the driving power unit mount is fixed to the subframe at a fixing point located substantially on an imaginary center line drawn in a front-rear direction via a center of the driving power unit mount, as viewed in an up-down direction.

3. The high voltage harness routing structure as claimed in claim 1, wherein the protector includes an electric-power-distribution-unit side portion and an electrical-auxiliary-unit side portion if the protector is imaginarily divided into two portions in the vehicle-width direction;

the electric-power-distribution-unit side portion is free from a fastening to the subframe and is arranged at a vehicle-inner position beyond a front bar of the subframe relative to a vehicle front-rear direction; and a plurality of high voltage harnesses are arranged vertically along one another within the protector when extending along the subframe in the vehicle-width direction.

4. The high voltage harness routing structure as claimed in claim 1, wherein the driving power unit mount includes a first mount bracket set at a relatively vehicle-inner position of a periphery of the mount main body, and second and third mount brackets set at relatively vehicle-outer positions of the periphery of the mount main body with respect to a front-rear direction;

the mount main body is supported by the first, second, and third mount brackets by means of three-point mounting; and the protector is located between a center of the driving power unit mount and the first mount bracket as viewed in an up-down direction.

5. The high voltage harness routing structure as claimed in claim 1, wherein the protector is formed with rounded corners provided in a protector's upper surface facing a bottom surface of the mount main body under the state where the protector is passed through the space formed in the driving power unit mount.

6. The high voltage harness routing structure as claimed in claim 1, wherein the driving power unit is a hybrid power unit including a transversely-mounted engine and at least one motor/generator as driving sources;

the electric power distribution unit is a power control unit configured to carry out two functions of an inverter function in which direct current derived from a battery is converted into alternating current for the motor/generator during a power running, and alternating current generated by the motor/generator is converted into direct current for the battery during a regenerating, and an electric power distribution function in which the direct current derived from the battery is distributed to the electrical auxiliary unit through the high voltage harness; and the electrical auxiliary unit is an electric compressor adapted to drive a compressor by using a motor.

7. The high voltage harness routing structure as claimed in claim 1, wherein the protector is separately divided into a first protector covering a periphery of at least a part of a high voltage harness's portion dropping from the connecting terminal of the electric power distribution unit toward the subframe, and a second protector covering a periphery of at least a part of a high voltage harness's portion extending along the subframe in the vehicle-width direction.

8. The high voltage harness routing structure as claimed in claim 7, wherein the first protector includes an upper portion fixed to the vehicle body and a lower portion made to be free from a fastening to the vehicle body; and a periphery of a high voltage harness's portion between an lower end of the first protector and the second protector is covered by a corrugated tube having a deformation following capability.

9. The high voltage harness routing structure as claimed in claim 8, wherein the high voltage harness's portion covered by the corrugated tube between the lower end of the first protector and the second protector is fixed to the subframe at a vehicle-inner position beyond a front bar of the subframe through a bracket, with respect to a vehicle front-rear direction.

10. The high voltage harness routing structure as claimed in claim 8, wherein the second protector includes an electric-power-distribution-unit side portion and an electrical-auxiliary-unit side portion if the second protector is imaginarily divided into two portions in the vehicle-width direction;

the electrical-auxiliary-unit side portion is fixed directly to the subframe;

the electric-power-distribution-unit side portion is free from a fastening to the subframe; and among the high voltage harness's portion covered by the corrugated tube, a portion extending along the subframe in the vehicle-width direction is fixed to the subframe at a fixing point located apart from an end surface of the electric-power-distribution-unit side portion of the second protector in the vehicle-width direction by a length prescribed to follow a deformation of the subframe.

11. The high voltage harness routing structure as claimed in claim 8, wherein among the high voltage harness's portion covered by the corrugated tube, a portion dropping from the lower end of the first protector is made to drop in a direction slanted toward a vehicle outside from a vertical direction relative to the vehicle-width direction by an angle set so as to allow the corrugated tube to keep its extra length capable of following the subframe even if the subframe relatively moves in an up-down direction after a collision.

12. The high voltage harness routing structure as claimed in claim 1, wherein the high voltage harness's portion extending along the subframe in the vehicle-width direction and interfering with the driving power unit mount is defined by a high voltage harness's portion extending along the subframe in the vehicle-width direction and overlapping with the driving power unit mount in a front-rear direction.

13. The high voltage harness routing structure as claimed in claim 1, wherein the high voltage harness's portion extending along the subframe in the vehicle-width direction and interfering with the driving power unit mount is defined by a high voltage harness's portion extending along the subframe in the vehicle-width direction and overlapping with the mount bracket in a front-rear direction.

14. The high voltage harness routing structure as claimed in claim 1, wherein the driving power unit mount includes a plurality of mount brackets supporting the mount main body; and the high voltage harness covered by the protector is passed through the space at least between two of the plurality of mount brackets.

15. The high voltage harness routing structure as claimed in claim 3, wherein the electric-power-distribution-unit side portion and the electrical-auxiliary-unit side portion are defined by bordering the protector into two portions with an imaginary center line drawn in the front-rear direction via a center of the driving power unit mount, as viewed in an up-down direction.

16. The high voltage harness routing structure as claimed in claim 8, wherein the upper portion and the lower portion of the first protector are defined by bordering the first protector into substantially half-length two portions.

* * * * *